United States Patent [19]

Erdman et al.

[11] Patent Number: 5,075,608
[45] Date of Patent: Dec. 24, 1991

[54] CONTROL SYSTEM, ELECTRONICALLY COMMUTATED MOTOR SYSTEM, DRAFT INDUCER APPARATUS AND METHOD

[76] Inventors: David M. Erdman, 5120 Archwood La., Fort Wayne, Ind. 46825; Mark A. Brattoli, 1543 Lakehurst Dr., Fort Wayne, Ind. 46815

[21] Appl. No.: 483,329

[22] Filed: Feb. 20, 1990

Related U.S. Application Data

[63] Continuation of Ser. No. 192,249, May 10, 1988, abandoned, which is a continuation-in-part of Ser. No. 15,409, Feb. 17, 1987, Pat. No. 4,743,347, which is a continuation-in-part of Ser. No. 463,147, Feb. 2, 1983, Pat. No. 4,654,566, which is a continuation-in-part of Ser. No. 412,421, Aug. 27, 1982, Pat. No. 4,449,079, which is a continuation of Ser. No. 141,267, Apr. 17, 1979, abandoned, which is a continuation-in-part of Ser. No. 77,656, Sep. 21, 1979, abandoned, which is a continuation-in-part of Ser. No. 802,484, Jun. 1, 1977, Pat. No. 4,169,990, which is a continuation-in-part of Ser. No. 729,761, Oct. 5, 1976, abandoned, which is a continuation-in-part of Ser. No. 482,409, Jun. 24, 1974, Pat. No. 4,005,347, and Ser. No. 482,407, Jun. 24, 1974, Pat. No. 4,015,182.

[51] Int. Cl.$^5$ .............................. H02P 7/29
[52] U.S. Cl. ........................ 318/599; 318/138; 318/254
[58] Field of Search ............ 318/138, 254, 439, 599; 126/516, 517, 521, 530, 533, 110 R, 110 A, 110 D, 104 A

[56] References Cited

U.S. PATENT DOCUMENTS

| | | | |
|---|---|---|---|
| 3,096,467 | 7/1963 | Angus et al. | 318/138 |
| 3,152,462 | 10/1964 | Elliott et al. | 68/12 |
| 3,165,685 | 1/1965 | Manteuffel et al. | 318/138 |
| 3,216,226 | 11/1965 | Alger et al. | 68/23 |
| 3,284,692 | 11/1966 | Gautherin | 321/16 |
| 3,293,532 | 12/1966 | Dubin et al. | 321/18 |
| 3,499,297 | 3/1970 | Ruff et al. | 62/160 |
| 3,559,013 | 1/1971 | Burch et al. | 318/138 |
| 3,577,053 | 5/1971 | McGee | 318/254 |
| 3,577,057 | 5/1971 | Dyer | 318/328 |
| 3,599,062 | 8/1971 | Crane et al. | 318/281 |
| 3,603,869 | 9/1971 | Neuffer et al. | 322/31 |

(List continued on next page.)

FOREIGN PATENT DOCUMENTS 74713 10/1974 Australia .
81938 3/1982 Australia .

(List continued on next page.)

OTHER PUBLICATIONS

Electro-Craft Corporation, "DC Motors Speed Controls Servo Systems", 1978, pp. 4–32 to 4–39, 5–86 to 5–93, 5–100, 6–1 to 6–15, 6–17, 6–29.

Revankar, G. N. et al., "Present Trends in Line-Current Harmonic Reduction in Single-Phase Thyristor Converters", J. Inst. Elect. & Telecom. Eng., vol. 25, No. 8 (Aug. 1979), pp. 349–355.

Intel Corporation, "MCS-48 Family of Single Chip Microcomputers User's Manual", Sep. 1981, pp. 2-2, 4-5.

*Primary Examiner*—Bentsu Ro

[57] ABSTRACT

A control system and method for an electronically commutated motor having a stationary assembly with a plurality of winding stages for carrying a motor current in response to application of a voltage having a magnitude subject to variations, the motor further having a rotatable assembly. The control system is adapted to receive control pulses having a duty cycle which is a function of a desired operating torque or speed for the motor. The control system and method are responsive to the motor current for generating a pluse width modulated (PWM) series of pulses having a pulse repetition rate having a duty cycle which is a function of the duty cycle of the control pulses. The PWM series of pulses are supplied to the commutating circuit as a pulsed signal whereby the operating torque or speed of the motor is a function of the duty cycle of the control pulses and is substantially independent of variations in the magnitude of the applied voltage. The control system may be part of a draft inducer apparatus or method for use with a combustion chamber having an exhaust outlet including a fan for moving air through the exhaust outlet and thereby to induce a draft in the combustion chamber. A pressure sensor connected to the motor control apparatus may be located within the exhaust outlet.

75 Claims, 8 Drawing Sheets

U.S. PATENT DOCUMENTS

| | | | |
|---|---|---|---|
| 3,628,110 | 12/1971 | Casaday | 318/138 |
| 3,651,368 | 3/1972 | Hanada | 318/254 |
| 3,689,815 | 9/1972 | Thibaut | 318/281 |
| 3,696,277 | 10/1972 | Liska et al. | 318/138 |
| 3,696,278 | 10/1972 | Kuniyoshi et al. | 318/138 |
| 3,733,540 | 5/1973 | Hawkins | 321/47 |
| 3,766,458 | 10/1973 | Nishimura et al. | 318/313 |
| 3,803,863 | 4/1974 | Jednacz et al. | 62/209 |
| 3,824,446 | 7/1974 | Forster et al. | 321/12 |
| 3,849,718 | 11/1974 | Förster et al. | 321/40 |
| 3,877,243 | 4/1975 | Kramer | 62/180 |
| 3,894,277 | 7/1975 | Tachibana et al. | 318/138 |
| 3,896,348 | 7/1975 | Loderer | 318/227 |
| 3,898,544 | 8/1975 | Tanikoshi | 318/254 |
| 3,969,658 | 7/1976 | Htsui | 318/202 |
| 3,997,823 | 12/1976 | Machida | 318/138 |
| 4,011,487 | 3/1977 | Loomis | 318/138 |
| 4,016,468 | 4/1977 | Graf | 318/434 |
| 4,024,725 | 5/1977 | Uchida et al. | 62/176 |
| 4,025,833 | 5/1977 | Lawton | 318/221 |
| 4,080,553 | 3/1978 | Lyman | 318/138 |
| 4,103,216 | 7/1978 | Hayes | 318/685 |
| 4,151,450 | 4/1979 | Fukuma et al. | 318/317 |
| 4,175,409 | 11/1979 | Morey | 68/4 |
| 4,227,106 | 10/1980 | Druss et al. | 310/184 |
| 4,255,696 | 3/1981 | Field, II | 318/696 |
| 4,275,343 | 6/1981 | Fulton et al. | 318/721 |
| 4,282,464 | 8/1981 | Uzuka | 318/138 |
| 4,282,471 | 8/1981 | Budniak et al. | 318/685 |
| 4,423,343 | 12/1983 | Field, II | 310/49 R |
| 4,494,055 | 1/1985 | Bitting et al. | 318/254 |
| 4,499,408 | 2/1985 | Bitting et al. | 318/254 |
| 4,525,658 | 6/1985 | Yanagida | 318/599 X |
| 4,528,485 | 7/1985 | Boyd, Jr. | 318/138 |
| 4,540,921 | 9/1985 | Boyd, Jr. et al. | 318/254 |
| 4,560,909 | 12/1985 | Peil | 315/291 |
| 4,591,768 | 5/1986 | Kudelski | 318/599 X |
| 4,636,936 | 1/1987 | Boyd, Jr. et al. | 346/148 |
| 4,638,233 | 1/1987 | Erdman | 318/254 X |
| 4,642,536 | 2/1987 | Boyd, Jr. et al. | 318/254 |
| 4,667,480 | 5/1987 | Bessler | 62/180 |
| 4,673,855 | 6/1987 | Boillat | 318/685 X |
| 4,675,589 | 6/1987 | Sausner et al. | 318/599 |
| 4,677,357 | 6/1987 | Spence et al. | 126/104 A X |
| 4,678,973 | 7/1987 | Elliott et al. | 318/254 |
| 4,686,436 | 8/1987 | Archer | 318/254 |
| 4,687,977 | 8/1987 | Brahmavar et al. | 318/492 |
| 4,694,210 | 9/1987 | Elliott et al. | 310/68 R |
| 4,694,228 | 9/1987 | Michaelis | 318/599 X |
| 4,712,050 | 12/1987 | Nagasawa et al. | 318/254 |
| 4,749,927 | 6/1988 | Rodal et al. | 318/599 |

FOREIGN PATENT DOCUMENTS

| | | | |
|---|---|---|---|
| 926464 | 5/1973 | Canada | 318/120 |
| 1035008 | 7/1978 | Canada | 318/90 |
| 1040287 | 10/1978 | Canada | 341/28 |
| 1140658 | 2/1983 | Canada | 342/19.4 |
| 1199997 | 1/1986 | Canada . | |
| 38694 | 10/1981 | European Pat. Off. | 6/02 |
| 146673 | 7/1985 | European Pat. Off. | 6/02 |
| 218017 | 4/1987 | European Pat. Off. | 6/2 |
| 1800557 | 5/1970 | Fed. Rep. of Germany . | |
| 1806620 | 5/1970 | Fed. Rep. of Germany . | |
| 2129272 | 12/1971 | Fed. Rep. of Germany . | |
| 2251094 | 4/1973 | Fed. Rep. of Germany . | |
| 1610045 | 8/1974 | Fed. Rep. of Germany | 29/4 |
| 2450968 | 5/1975 | Fed. Rep. of Germany . | |
| 2834523 | 2/1980 | Fed. Rep. of Germany . | |
| 3218448 | 11/1983 | Fed. Rep. of Germany | 318/599 |
| 2009348 | 1/1970 | France . | |
| 2239796 | 2/1975 | France . | |
| 46-41247 | 12/1971 | Japan . | |
| 57-31306 | 2/1982 | Japan | 318/599 |
| 58-19903 | 2/1983 | Japan | 318/599 |
| 98755 | 6/1985 | Japan . | |
| 1396865 | 8/1987 | Japan . | |
| 62-247786 | 10/1987 | Japan | 318/599 |
| 359206 | 8/1970 | Sweden . | |
| 1358404 | 7/1974 | United Kingdom . | |
| 1510876 | 5/1978 | United Kingdom . | |
| 2119185 | 11/1983 | United Kingdom . | |
| 2134731 | 7/1987 | United Kingdom . | |
| 2176067 | 7/1987 | United Kingdom . | |
| 2176068 | 7/1987 | United Kingdom . | |

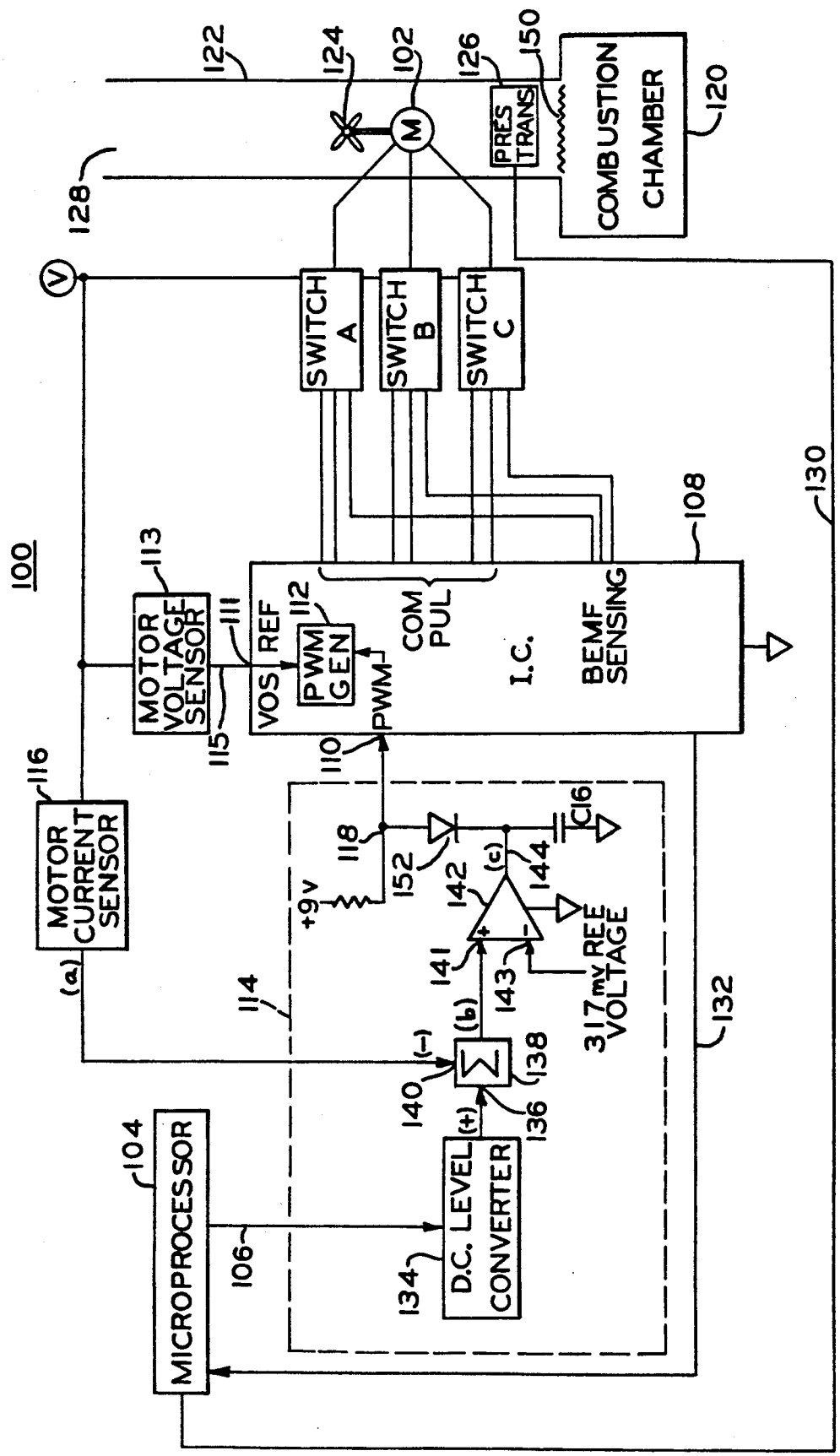
FIG.1 CURRENT/TORQUE CONTROL

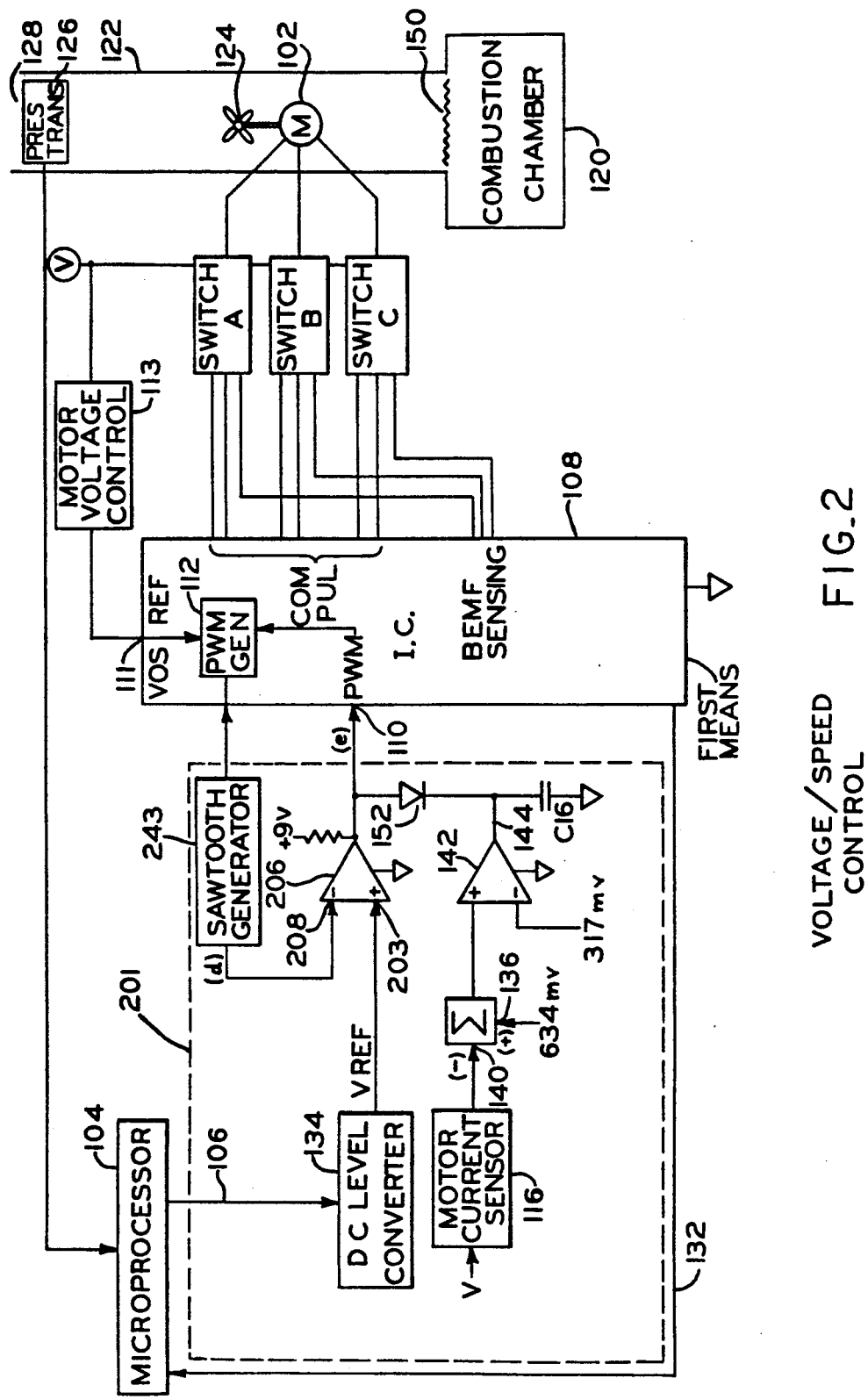
FIG._2

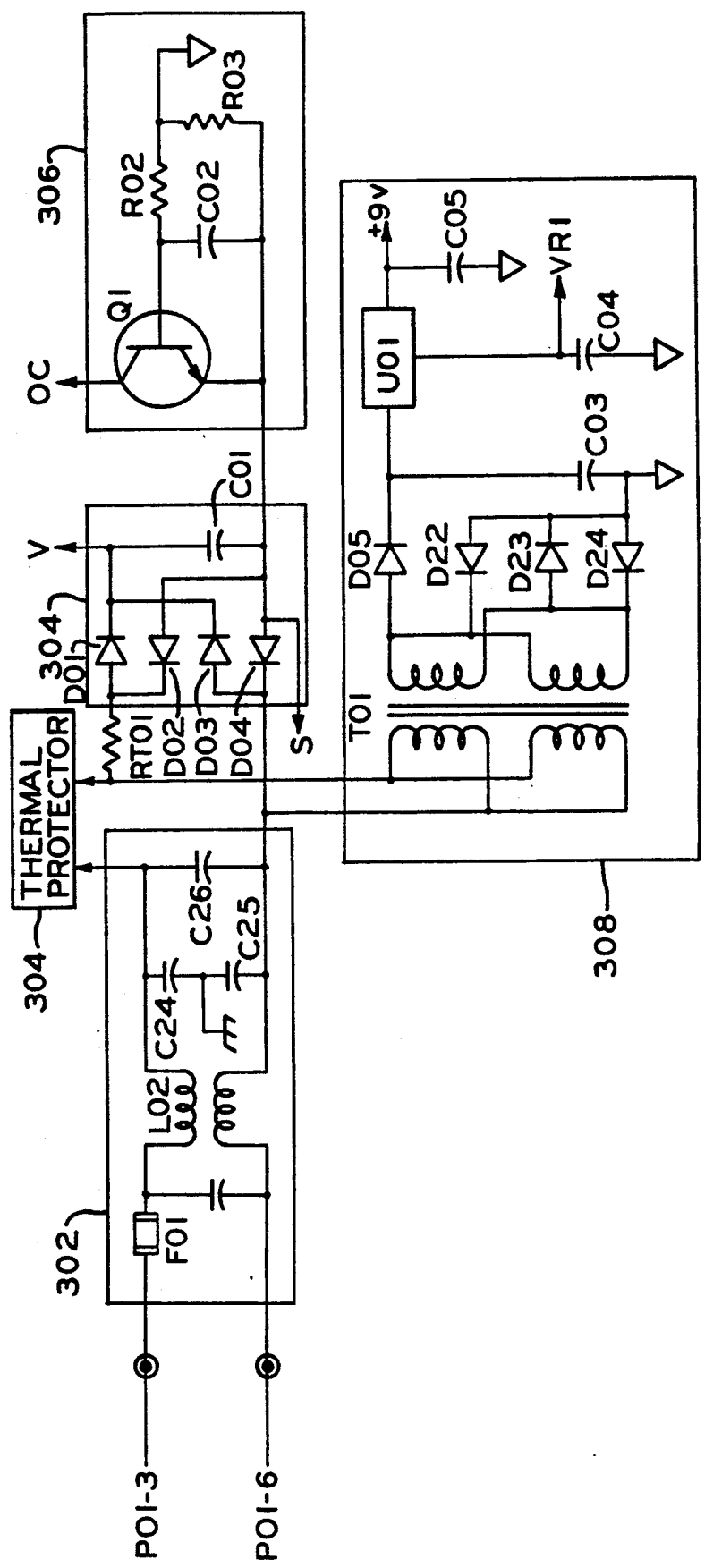
FIG._3

FIG_6

CONTROL SYSTEM, ELECTRONICALLY COMMUTATED MOTOR SYSTEM, DRAFT INDUCER APPARATUS AND METHOD

CROSS REFERENCE TO RELATED APPLICATIONS

This is a continuation of co-pending application Ser. No. 07/192,249 filed on May 10, 1988, now abandoned which is a continuation-in-part of copending application Ser. No. 07/015,409 filed Feb. 17, 1987 (now U.S. Pat. No. 4,743,347) which was a continuation-in-part of application Ser. No. 463,147 filed Feb. 2, 1983 (now U.S. Pat. No. 4,654,566) which was a continuation-in-part of Ser. No. 412,421 filed Aug. 27, 1982 (now U.S. Pat. No. 4,449,079) which was a continuation of application Ser. No. 141,267 filed Apr. 17, 1980 (now abandoned) which was a continuation-in-part of application Ser. No. 077,656 filed Sept. 21, 1979 (now abandoned) which was a continuation-in-part of application Ser. No. 802,484 filed June 1, 1977 (now U.S. Pat. No. 4,169,990) which was a continuation-in-part of application Ser. No. 729,761 filed Oct. 5, 1976 (now abandoned) which was a continuation-in-part of application Ser. No. 482,409 filed June 24, 1974 (now U.S. Pat. No. 4,005,347) and of application Ser. No. 482,407 filed June 24, 1974 (now U.S. Pat. No. 4,015,182). Each of the aforementioned applications and patents are commonly assigned and are respectively incorporated by reference herein.

This application is also related to coassigned U.S. Pat. Nos. 4,015,182; 4,162,435; 4,500,821; 4,459,519; 4,528,485 and 4,532,459. The entire disclosures of each of these patents are also specifically incorporated herein by reference.

FIELD OF THE INVENTION

This invention relates in general to dynamoelectric machines, control systems and application systems for such machines and to methods of their control and operation. More particularly, this invention relates to control systems for an electronically commutated motor, electronically commutated motor systems, draft inducer apparatus, and methods of their control and operation.

BACKGROUND OF THE INVENTION

While conventional brush-commutated DC motors may have advantageous characteristics, including convenience of changing operational speeds, there may be disadvantages such as brush wear, electrical loss, noise and radio frequency interference caused by sparking between the brushes and the segmented commutator, which may limit the applicability of such brush-commutated DC motors in some fields such as the furnace blower control field. Electronically commutated motors, such as brushless DC motors and permanent magnet motors with electronic commutation, have now been developed and generally are believed to have the above discussed advantageous characteristics of the brush-commutated DC motors without many of the disadvantages thereof while also having other important advantages. Such electronically commutated motors are disclosed in the David M. Erdman U.S. Pat. Nos. 4,015,182 and 4,459,519, for instance. These electronically commutated motors are advantageously employed, for instance, in various air handling applications such as air conditioning for cooling and warming.

In a conventional furnace, considerable heat energy is wasted when it is exhausted to the atmosphere. This makes the overall efficiency of the system poor considering the BTU content of the fuel. Efficiency and fuel economy can be greatly improved by extracting the heat from the furnace exhaust. Natural convection of the hot exhaust causes it to rise and vent to the atmosphere. In order to improve efficiency and economy, the heat is extracted from the exhaust by a heat exchanger in which case additional pressure is needed to force the cooled exhaust to vent to the atmosphere. This is accomplished by inducing a draft.

In a draft inducer control system, such as used in high efficiency furnaces, a variable resistance can be used to vary the speed of a brush-type fan motor to induce drafts, but this would further reduce the energy efficiency of the system. While there are some losses engendered by electronic switching of an electronically commutated motor, these are negligible compared to brush losses and rheostat losses in prior art variable speed draft inducer systems.

Further improvements in control systems, electronically commutated motor systems, draft inducer apparatus and methods of control and operation can beneficially contribute to more widespread use of such motors in various applications including fan control for inducing drafts in high efficiency furnaces. For example, sudden changes in resistance to draft and line voltage variations can lead to reduced drafts or excessive drafts which adversely affect furnace efficiency and product potentially dangerous backdrafts or over-drafts. Improvements which achieve increased torque and speed control would be desirable. Economy of manufacture would also be enhanced by circuit improvements if they can be made with little extra cost as part of improved integrated circuit chips. Greater versatility of response to various control signal conditions and improved fail-safe features would also be desirable.

SUMMARY OF THE INVENTION

Among the objects of this invention are to provide an improved control system for an electronically commutated motor, an improved electronically commutated motor system, improved draft inducer apparatus and improved methods of control and operation which overcome at least some of the disadvantageous conditions discussed above; the provision of an improved control system for an electronically commutated motor, an improved electronically commutated motor system, improved draft inducer apparatus and improved methods of control and operation which substantially reduce drafts or increase drafts in a high efficiency furnace as a function of the pressure within the exhaust outlet of the furnace; the provision of an improved control system for an electronically commutated motor, an improved electronically commutated motor system, improved draft inducer apparatus and improved methods of control and operation which substantially reduce backdrafts and over-drafts causing inefficient combustion; the provision of an improved control system for an electronically commutated motor, an improved electronically commutated motor and system which converts a duty cycle signal to a corresponding output torque or speed on the motor; the provision of an improved control system for an electronically commutated motor, an improved electronically commutated motor system, improved draft inducer apparatus and improved methods of control and operation which compensate for line voltage variations; and the provision of an improved control system for an electronically commutated motor, an improved electronically commutated motor system, improved draft inducer apparatus and improved methods of control and operation which are electrically efficient, reliable, economical and convenient in use.

Generally, one form of the invention is a control system for an electronically commutated motor having a stationary assembly with a plurality of winding stages for carrying a motor current in response to application of a voltage having a magnitude subject to variations. The motor further has a rotatable assembly. The control system is adapted to receive control pulses having a duty cycle representing a desired operating torque for the motor. The control system is for use with a commutating circuit for applying the voltage to one or more of the winding stages at a time having a duty cycle which is a function of a pulsed signal and for commutating the winding stages in a preselected sequence to rotate the rotatable assembly. The control system comprises means for varying the duty cycle of the applied voltage inversely as a function of variations in the magnitude of the applied voltage. Means responsive to the motor current generates a pulse width modulated (PWM) series of pulses having a pulse repetition rate having a duty cycle which is a function of the duty cycle of the control pulses The generating means is adapted to supply the PWM series of pulses to the commutating circuit as the pulsed signal whereby the operating torque of the motor is a function of the duty cycle of the control pulses and is substantially independent of variations in the magnitude of the applied voltage.

A further form of the invention is a control system for an electronically commutated motor having a stationary assembly with a plurality of winding stages for carrying a motor current in response to application of a voltage having a magnitude subject to variations, the motor further having a rotatable assembly. The control system is adapted to receive control pulses having a duty cycle representing a desired operating torque for the motor. The control system is for use with a commutating circuit for applying the voltage to one or more of the winding stages at a time having a duty cycle which is a function of a pulsed signal and for commutating the winding stages in a preselected sequence to rotate the rotatable assembly. The control system comprises means for varying the duty cycle of the applied voltage inversely as a function of variations in the magnitude of the applied voltage. Means generates a pulse width modulated (PWM) series of pulses having a duty cycle which is a function of the duty cycle of the control pulses. The generating means is adapted to supply the PWM series of pulses to the commutating circuit as the pulsed signal whereby the operating speed of the motor is a function of the first duty cycle and is substantially independent of variations in the magnitude of the applied voltage.

A further form of the invention is a control system for an electronically commutated motor having a stationary assembly with a plurality of winding stages for carrying a motor current in response to application of a voltage having a magnitude subject to variations, the motor further having a rotatable assembly. The control system is responsive to a motor control apparatus adapted to control the motor by generating control pulses having a duty cycle representing a desired operating torque for the motor. The control system comprises means for applying a voltage having a duty cycle which is a function of a pulsed signal to one or more of the winding stages at a time and for commutating the winding stages in a preselected sequence to rotate the rotatable assembly. Means responsive to the motor current generates a pulse width modulated (PWM) series of pulses having a duty cycle which is a function of the duty cycle of the control pulses. The generating means is adapted to supply the PWM series of pulses to the applying means as the pulsed signal. Means provides a tachometer signal representative of the motor speed to the motor control apparatus whereby the control pulses are a function of the tachometer signal.

In another form the invention is a control system for an electronically commutated motor having a stationary assembly with a plurality of winding stages for carrying a motor current in response to application of a voltage having a magnitude subject to variations, the motor further having a rotatable assembly. The control system is responsive to a motor control apparatus adapted to control the motor by generating control pulses having a duty cycle representing a desired operating torque for the motor. The control system comprises means for applying a voltage having a duty cycle which is a function of a pulsed signal to one or more of the winding stages at a time and for commutating the winding stages in a preselected sequence to rotate the rotatable assembly. Means varies the duty cycle of the applied voltage is an inverse function of the magnitude of the applied voltage. Means generates a pulse width modulated (PWM) series of pulses having a duty cycle which is a function of the duty cycle of the control pulses. The generating means is adapted to supply the PWM series of pulses to the applying means as the pulsed signal. Means provides a tachometer signal representative of the motor speed to the motor control apparatus whereby the control pulses are a function of the tachometer signal.

In another form the invention is a control system for an electronically commutated motor having a stationary assembly with a plurality of winding stages for carrying a motor current and further having a rotatable assembly. The control system is adapted to receive control pulses having a duty cycle representing a desired operating torque or speed for the motor. The control system for use with a commutating circuit for applying a voltage to one or more of the winding stages at a time in accordance with a pulsed signal and for commutating the winding stages in a preselected sequence to rotate the rotatable assembly. The control system comprises means for selecting motor operating conditions including the motor current and the motor voltage. Means responds to the selected motor operating conditions for generating a pulse width modulated (PWM) series of pulses having a duty cycle which is a function of the duty cycle of the control pulses. The generating means is adapted to supply the PWM series of pulses to the commutating circuit as the pulsed signal whereby the torque of the motor is a function of the duty cycle of the control pulses when the motor current is selected and the speed of the motor is a function of the duty cycle of the control pulses when the motor voltage is selected.

Another form of the invention is a draft inducer apparatus for use with a combustion chamber having an exhaust outlet and comprises a fan for moving air through the exhaust outlet and thereby to induce a draft in the combustion chamber, and an electronically commutated motor including a stationary armature having a core and at least two energizable winding stages arranged to establish a predetermined number of magnetic poles, and a permanent magnet rotor coupled to the fan and adapted to rotate in response to the magnetic poles established by the windings. Means generates a pulse width modulated (PWM) series of pulses having a duty cycle representing a desired torque or speed of the motor. Means applies a voltage to one or more of the winding stages at a time in accordance with the series of pulses and commutates the winding stages in a preselected sequence to rotate the rotatable assembly and the fan.

In another form, the invention is a draft inducer apparatus for use with a combustion chamber having an exhaust outlet and comprising a fan for moving air through the exhaust outlet and thereby to induce a draft in the combustion chamber and an electronically commutated motor including a stationary armature having a core and at least two energizable winding stages arranged to establish a predetermined number of magnetic poles, and a permanent magnet rotor coupled to the fan and adapted to rotate in response to the magnetic poles established by the windings. Means provides a tachometer signal representative of the motor speed. Means, responsive to the tachometer means, generates a pulse width modulated (PWM) series of pulses having a duty cycle varying as a function of the tachometer signal. Means applies a voltage to one or more of the winding stages at a time in accordance with the series of pulses and commutates the winding stages in a preselected sequence to rotate the rotatable assembly and the fan.

The invention comprehends electronically commutated motor systems and draft inducer apparatus improved to include circuits of the types described above and other improvements. Also, various methods of the invention involve steps for accomplishing various aspects of the control and operation of the circuits described above.

Other objects and features will be in part apparent and in part pointed out hereinafter.

BRIEF DESCRIPTION OF THE DRAWINGS

FIG. 1 is a block diagram of one embodiment of a draft inducer apparatus according to the invention having an electronically commutated motor system including one embodiment of an electronic torque control according to the invention.

FIG. 2 is a block diagram of one embodiment of a draft inducer apparatus according to the invention having an electronically commutated motor system including one embodiment of an electronic speed control according to the invention.

FIG. 3 is a schematic diagram of one embodiment of a power supply according to the invention for use as part of an electronic control for an electronically commutated motor according to the invention.

Corresponding reference characters indicate corresponding parts throughout the several views of the drawings.

DETAILED DESCRIPTION OF PREFERRED EMBODIMENTS

Figure 1A:
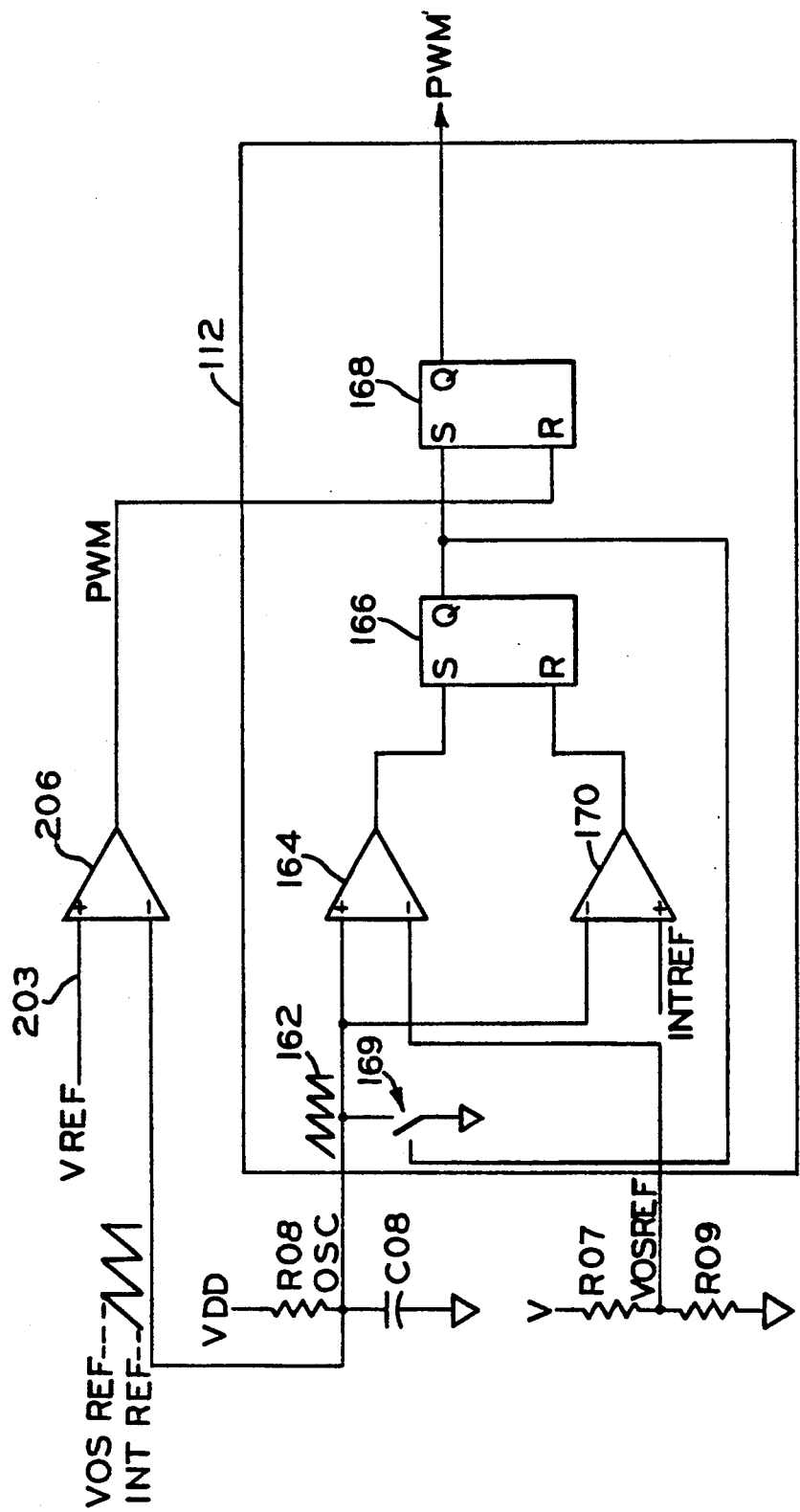
FIG. 1A is a block diagram of one embodiment of a circuit of the invention for controlling the duty cycle of the applied voltage inversely as a function of variations in the magnitude of the applied voltage.

FIG. 1 illustrates a control system 100 for an electronically commutated motor 102 having a stationary assembly with a plurality of winding stages for carrying a motor current in response to application of a voltage having a magnitude subject to variations, the motor further having a rotatable assembly (not shown). Control system 100 is adapted to receive control pulses, such as provided by microprocessor 104 via line 106, having a duty cycle representing a desired operating torque for motor 102.

Reference character 108 generally refers to an integrated circuit (IC) which is generally a universal IC for use as a commutating circuit in combination with an electronically commutated motor. Such an IC is described in coassigned U.S. Pat. No. 4,500,821 to Bitting, et al., incorporated herein by reference. IC 108 constitutes means for applying the voltage to one or more of the winding stages of motor 102 at a time having a duty cycle which is a function of a pulsed signal applied to PWM input port 110. IC 108 commutates the winding stages of the motor 102 in a preselected sequence to rotate the rotatable assembly. IC 108 includes a pulse width modulated pulse generator (PWM generator) 112 adapted to provide an oscillating signal, i.e., a PWM series of pulses, having a duty cycle controlled, in part, by a voltage applied to voltage oscillator reference (VOSREF) input port 111. In particular, PWM generator 112 is adapted to generate an oscillating signal having a duty cycle which is an inverse function of the motor voltage as sensed by motor voltage sensor 113. As a result, IC 108 constitutes means for varying the duty cycle of the voltage applied to the winding stages inversely as a function of variations in the magnitude of the applied voltage.

The electronic control circuit for IC 108 is generally referred to by reference character 114 and constitutes means responsive to the motor current as sensed by motor current sensor 116. Circuit 114 generates the PWM series of pulses to be applied to PWM input port 110 having a duty cycle which is a function of the duty cycle of the control pulses provided by microprocessor 104 via line 106. As a result, the operating torque of the motor 102 is a function of the duty cycle of the control pulses and is independent of variations in the magnitude of the applied voltage.

Specifically, FIG. 1 illustrates a draft inducer apparatus for use with combustion chamber 120 having exhaust outlet 122 Fan 124, preferably positioned within the exhaust outlet 122, moves air through exhaust outlet 122 and thereby induces a draft in combustion chamber 120. Electronically commutated motor 102 includes a stationary armature having a core and at least two energizable winding stages arranged to establish a predetermined number of magnetic poles (not shown), and a permanent magnet rotor (not shown) coupled to fan 124 and adapted to rotate in response to the magnetic poles established by the windings.

Pressure transducer 126, preferably located within exhaust outlet 122 between fan 124 and combustion chamber 120, constitutes sensor means for sensing the pressure within exhaust outlet 122. It is contemplated that pressure transducer 126 may be located anywhere within exhaust outlet 122. Although transducer 126 is shown and illustrated in FIG. 1 as a pressure transducer located between motor 102 and combustion chamber 120, transducer 126 may be any sensor means located between combustion chamber 120 and exhaust outlet port 128.

Pressure transducer 126 provides a pressure representative signal via line 130 to microprocessor 104 indicating the pressure within exhaust outlet 122. Microprocessor 104 evaluates the pressure representative signal as part of the procedure it follows to determine the duty cycle of the PWM series of pulses provided via line 106. For example, microprocessor 104 may compare the pressure signal to a desired reference dependent upon the particular cycle of combustion chamber 120 (e.g., purge cycle, operating cycle or maximum heat cycle). Three variables determine the operating parameters of motor 102: the torque of the motor as specified by the control pulses (due to linearity between duty cycle of control pulses and the current limiting features of circuit 114), the pressure specified by pressure transducer 126, and the speed of the motor as specified by the tachometer signal provided via line 132. Therefore, microprocessor 104 constitutes means connected to transducer 126 for generating control pulses via line 106 having a duty cycle varying as a function of the pressure within exhaust outlet 122. As a result, IC 108 constitutes means for applying a voltage to one or more of the winding stages of motor 102 at a time in accordance with the control pulses generated by microprocessor 104 provided via line 106. IC 108 commutates the winding stages in a preselected sequence to rotate the rotatable assembly of motor 102 and fan 124 with a variable torque as a function of the pressure; e.g., the torque is increased when the pressure within exhaust outlet 122 is above a preselected limit. As a result, a draft is induced through exhaust outlet 122 and in the combustion chamber when the pressure is above the preselected limit. IC 108 also constitutes means for providing a tachometer signal via line 132 representative of the motor speed. Microprocessor 104 is connected to the IC 108 via line 132 to receive the tachometer signal and the series of pulses provided by microprocessor 104 via line 106 has a duty cycle varying as a function of the pressure and the tachometer signal.

Electronic control circuit 114 includes DC level converter 134 for receiving the control pulses provided via line 106 by microprocessor 104. The control pulses generally have a frequency in the range of 30-60 hertz. DC level converter 134 converts the control pulses into a signal having a positive voltage which is a function of the duty cycle of the control pulses. Converter 134 constitutes means for generating a first voltage having a magnitude which is a function of the control pulses provided via line 106. This positive voltage signal is provided to first input 136 of summer 138. The other (second) input 140 of summer 138 is provided with a negative voltage signal which is a function of the motor current as measured by motor current sensor 116. Summer 138 compares the motor current signal via input 140 to the signal via input 136 which represents the duty cycle of the control pulses and provides an output signal (b) in response thereto The sum of these two voltages is applied to noninverting input 141 of comparator 142 and compared to a voltage reference which is provided to inverting input 143 of comparator 142. When the voltage of the signal applied to input 140 representing the motor current exceeds in magnitude the voltage signal applied to input 136 representing the desired duty cycle by an amount which is greater than the reference voltage applied to input 143 of comparator 142, the output 144 of comparator 142 is pulled from high to low (i.e., grounded). This prevents PWM input port 110 from receiving a reference voltage signal applied through resistor 150 to PWM input 110 via line 118 so that no voltage is applied to the winding stages for the remainder of the cycle of PWM generator 112.

As the motor current increases as detected by sensor 116, the corresponding negative voltage provided to input 140 of summer 138 increases in magnitude so that the voltage applied to noninverting input 141 of comparator 142 is a negative voltage of increasing magnitude. Sensor 116 constitutes means for generating a second voltage having a magnitude which is a function of the motor current. When the magnitude of the voltage applied to noninverting input 141 of comparator 142 is less than the magnitude of the reference voltage applied to the inverting input 143, the output 144 of comparator 142 is switched low. As a result, diode 152 is no longer reverse-biased and provides a path for current from the +9 volt reference applied through resistor 150 to PWM input port via line 118 which shuts off any signal being provided to PWM input port 110 by conducting the +9 volt PWM voltage away from IC 108. As a result, comparator 141, the +9 volt reference and diode 152 constitute means for providing a series of pulses as the PWM series of pulses, each pulse having a width which is a function of the output signal of summer 138. Comparator 141 also constitutes means for selectively inhibiting +9 volt PWM voltage and for generating the PWM series of pulses during the period that the sum is greater than the reference voltage.

By discontinuing application of the +9 volt reference signal being provided to PWM input port 110, the controlling bridge transistor (i.e., the transistor of switches A, B and C which is, at that moment, on and applying a voltage to the motor windings) is turned off so that no voltage is applied to the windings of motor 102. The controlling transistor is latched off for the remainder of the clock cycle (i.e., one oscillation of PWM generator 112) even though output 144 of comparator 142 may go high during the cycle and the reference voltage on line 118 is again provided to PWM input port 110. The controlling transistor does not turn on again during the remainder of clock oscillator cycle because port 110 of IC 108 includes a latch (not shown) that is reset by the start of each oscillator cycle. The latch does not allow the controlling bridge transistor to become conductive until the end of the clock cycle even though a +9 V signal may be applied again to PWM input port 110 before the end of the cycle. In summary, whenever the reference voltage applied to PWM input port 110 via line 118 is interrupted by comparator 142, the controlling bridge transistor which at that point is applying a voltage to the motor windings is turned off (becomes nonconductive) and is latched off until the end of the cycle of PWM generator 112 even though the reference voltage may again be applied to PWM input port 110 via line 118 as a result of the output of comparator 142 going high before the end of the cycle. As soon as comparator 142 is switched low and the motor voltage is discontinued, the motor current decreases considerably before the end of oscillator cycle. When the latch is reset, the motor current causes summer input 140 to add less negative voltage making the summed voltage applied to comparator input 141 greater than the 317 mv reference applied to comparator input 143. This results in a signal being applied to input 110. This latching of the PWM signal is described in U.S. Pat. Nos. 4,642,537 (particularly with respect to FIG. 6A) and 4,654,566 (particularly with respect to FIG. 13). Both patents are incorporated herein by reference.

Figure 4:
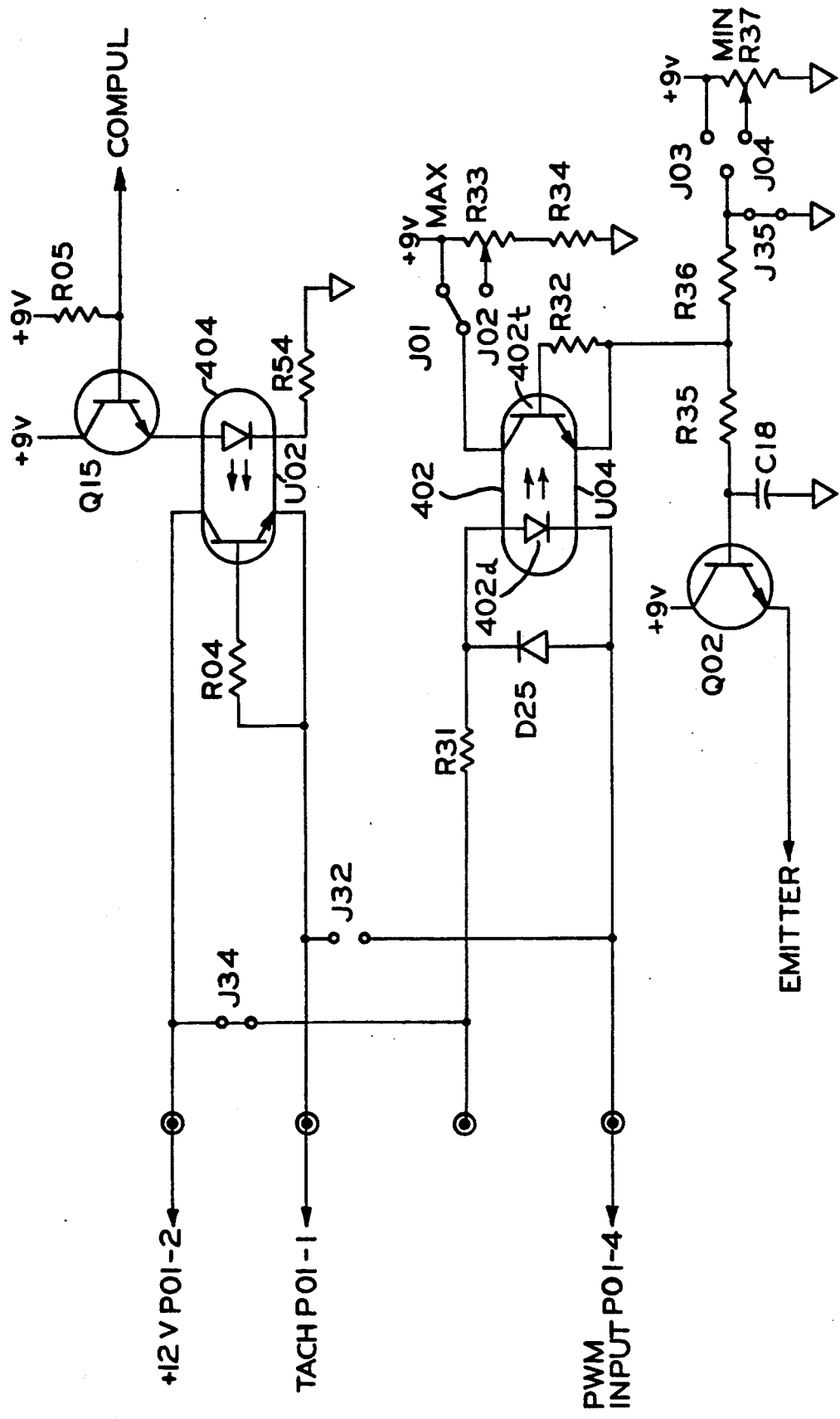
FIG. 4 is a schematic diagram of one embodiment of an isolation circuit according to the invention for use as part of an electronic control for an electronically commutated motor according to the invention.

Switches A, B, and C correspond to switches A, B, and C illustrated in FIG. 4 of U.S. Pat. No. 4,500,821, incorporated herein by reference. IC 108 corresponds to the motor control IC of that patent Control and operation of the switches and the IC is described therein and, particularly, in columns 9, 10 and 11 of that patent.

In a typical furnace, natural convection of the hot exhaust causes it to rise and vent to the atmosphere. In order to improve the efficiency and fuel economy, the heat is extracted from the exhaust furnace by, for example, by heat exchanger 150. If heat is extracted from this exhaust, then additional pressure is needed to force the cooled exhaust to vent to the atmosphere through the exhaust outlet 122. This is accomplished by inducing a draft such as by locating fan 124 in the exhaust outlet 122. A positive flue pressure is developed by fan 124 which forces the furnace exhaust from combustion chamber 120 through heat exchanger 150 where the heat is extracted and the cooled exhaust air is then vented via exhaust outlet 122. The cooled exhaust is provided to the atmosphere at exhaust outlet port 128. As a result, the exhaust temperature is low enough where a chimney is no longer needed and an additional cost savings is provided.

The speed of fan 124 as driven by the rotor of motor 102 regulates the air flow rate. In high efficiency systems, it is important to achieve the proper amount of air mixed with fuel (e.g., natural gas, oil) so that an optimum air-fuel mixture is constantly being burned in combustion chamber 120. To achieve the appropriate air-fuel mixture, combustion products must be exhausted at an appropriate rate. Generally, these products do not rise up through the exhaust outlet 122 because they are cold and create a pressure in exhaust outlet 122. Pressure transducer 126 monitors the pressure within exhaust outlet 122 and provides a signal via line 130 to microprocessor 104 representative thereof. Microprocessor 104 generates a series of control pulses via line 106 having a duty cycle which is a function of the pressure thereby controlling the duty cycle of motor 102 and the speed of fan 124 in response to the pressure measured by pressure transducer 126. Depending on the particular cycle within which the furnace is operating, microprocessor 104 would compare the signal provided by transducer 126 via line 130 to a reference which would indicate a preselected pressure limit for the particular cycle. When the signal provided via line 130 indicates that the pressure within exhaust outlet 122 has exceeded the pressure limit, microprocessor 104 would turn on or increase the duty cycle of the signal provided via line 106 to DC level converter 134 in order to increase the torque (or speed) of fan 124. This would increase the air flow rate through exhaust outlet 122 so that the pressure within the exhaust outlet 122 would decrease. When the pressure has decreased to a point below the pressure limit, microprocessor 104 would provide turn off or reduce the duty cycle of the signal provided via line 106 to DC level converter 134 in order to stabilize or decrease the torque (or speed) of fan 124.

Microprocessor 104 monitors the speed of fan 124 through the tachometer signal provided via line 132. This permits microprocessor 104 to increase or decrease the duty cycle of the signal provided via line 106 depending upon the speed of the fan as compared to a desired speed. Microprocessor 104, for example, may include a storage memory programmed with a speed vs. torque profile so that the relationship between speed and torque would be known (or could be calculated) permitting microprocessor 104 to determine, for a given desired torque, the corresponding speed. Microprocessor 104 constitutes a motor control apparatus adapted to control the motor by generating control pulses having a duty cycle which is a function of a desired operating torque (depending on the furnace cycle) and a function of the speed of the motor.

PWM generator 112 may be internal to IC 108 as illustrated herein or may be external, discrete components associated with IC 108. Alternatively, a voltage regulation controller according to the invention may be employed as part of the control illustrated in U.S. Pat. No. 4,500,821. For example, in FIG. 10A of that patent illustrates an oscillator 147 including comparator (COM) 4 which compares an oscillating (OSC) signal to a 1.8 volt reference (PWM REF). In order to achieve voltage regulation control according to the invention, a voltage varying as a function of the line voltage would be applied to the inverting input of comparator 4 in place of the 1.8 volt reference.

One embodiment of voltage regulator control (PWM generator) 112 is illustrated in FIG. 1A. Voltage VDD applied to an oscillator constituting resistor RO8 and capacitor CO8 generates an oscillating signal OSC having a sawtooth waveform as illustrated by reference character 162. This waveform is applied to the noninverting input of comparator 164. The inverting input of comparator 164 receives voltage signal VOSREF which is a function of the line voltage V applied to the motor windings divided by resistors RO7 and RO9. At some point during the rise time of the ramp of sawtooth waveform 162, the oscillating signal OSC is greater that voltage signal VOSREF. As a result, the output of comparator 164 is high which sets latch 166 to provide a high output at Q of latch 166 thereby setting latch 168 so that pulse width modulation is enabled and the output at Q of latch 168 is high. When the output of latch 166 is high, analog switch 169 closes and discharges CO8. At some point during the fall time of the sawtooth waveform, the oscillating signal OSC applied to the inverting input of comparator 170 becomes less than the internal reference (INTREF) applied to the noninverting input of comparator 170. As a result, the output of comparator 170 is high which resets latch 166 forcing it to provide a low output at Q of latch 166. Therefore, latch 168 is forced to reset by the PWM signal from comparator 206 so that pulse width modulation is disabled and the output at Q of latch 168 is held low until latch 168 is set again. In the torque regulation mode, VREF is generally always higher than OSC so that comparator 206 is always high.

Comparator 164 and divider RO7, RO9 constitutes means for comparing the applied voltage V to a reference voltage OSC. Latches 166 and 168 constitute means, responsive to comparator 164 and divider RO7, RO9 for increasing the duty cycle of the PWM series of pulses when the applied voltage decreases and for decreasing the duty cycle of the PWM series of pulses when the applied voltage increases Latches 166 and 168 are responsive to the output signal of comparator 164 and are adapted to inhibit the PWM series of pulses during the period that the oscillating voltage signal OSC is greater than the applied voltage V as sensed by divider RO7, RO9.

Referring to FIG. 2, the electronic control circuit for IC 108 is generally referred to by reference character 201 and constitutes means for generating the PWM series of pulses to be applied to PWM input port 110 having a duty cycle which is a function of the duty cycle of the control pulses provided by microprocessor 104 via line 106. As a result, the operating speed of the motor 102 is a function of the duty cycle of the control pulses provided by microprocessor 104 via line 106 and is independent of variations in the magnitude of the applied voltage.

Electronic control circuit 201 includes DC level converter 134 for receiving the control pulses provided via line 106 by microprocessor 104. The control pulses would generally have a frequency in the range of 30–60 hertz. DC level converter 134 converts the control pulses into a signal having a positive voltage which is a function of the duty cycle of the control pulses. This positive voltage signal is applied to noninverting input 203 of comparator 206. Therefore, comparator 206 comprises means for comparing oscillating reference signal (d) and signal VREF representing the duty cycle of the control pulses and providing an output signal (e) in response thereto as the PWM series of pulses. The inverting input 208 of summer 138 is provided with a positive voltage signal (d) having a sawtooth waveform (see FIG. 7, reference character 708) provided by sawtooth generator 243. The sawtooth waveform (d) is provided to the inverting input 208 of comparator 206 and compared to the voltage representing the desired duty cycle which is provided to the noninverting input 203 of comparator 206. When the voltage of the sawtooth signal exceeds the threshold voltage signal VREF representing the desired duty cycle, the output of comparator 206 is pulled from high to low (i.e., grounded) and voltage regulation is shut down for the remainder of the sawtooth oscillation cycle, i.e., when CO8 is discharged. This interrupts the +9 volt reference voltage provided to PWM input port 110 so that no voltage is applied to the winding stages until the next oscillator cycle and the voltage applied to input 203 is greater than the sawtooth voltage signal applied to input 208.

In the voltage regulation mode, as illustrated in FIG. 2, a 634 mv reference voltage is applied to input 140 of the summer as a current limiter. This reference voltage is in place of dc level corresponding to duty cycle applied to input 136 as shown in FIG. 1. When the negative voltage corresponding to the motor current as sensed by sensor 116 added to the 634 mv reference exceeds 330 mv, output 144 of comparator goes low to interrupt the signal applied to PWM input port 110 and discontinue application of the applied voltage to the windings. Therefore, except in a current limiting condition, the speed of fan 124 driven by motor 102 is regulated in response to the control pulses provided by microprocessor 106 and, as in the torque regulation mode of FIG. 1, independent of variations in the applied voltage.

FIG. 3 illustrates the power supply circuitry of the motor. EMI filter 302 is provided to minimize switching noise which may be injected back into the 120 volt AC power being applied to pins 1-3 and 1-6. EMI filter 302 includes common mode inductor LO2 in parallel with filter capacitors C23, C24, C25 and C26. The EMI filtered power supply voltage is provided through thermal protector 304 to surge limiter RTO1 and then through diode bridge DO1, DO2, DO2 and DO4 in parallel with electrolytic capacitor CO1 thereby generating a 160 volt signal V required to drive the motor. The diodes and capacitor CO1 function as high voltage DC filter 304. Overcurrent sensor circuit 306 includes current shunt resistor RO3 which provides shunt voltage S representing the motor current. This shunt voltage is filtered by capacitor CO2 and resistor RO2. When the shunt voltage exceeds the desired maximum set by RO3, the base of transistor QO1 is turned on to generate an overcurrent voltage signal OC applied to the lockoff port of IC 108 via resistor R17 and capacitor C10 (see FIG. 5).

Low voltage power supply 308 includes transformer TO1 having a primary connected through thermal protector 304 to applied voltage V and a secondary in parallel with diode bridge DO5, D22, D23 and D24 as filtered by capacitor CO3 to drive voltage regulator UO1 for providing a nine volt reference filtered by capacitor CO5 and also to provide reference voltage VR1 filtered by capacitor CO4 which represents one diode voltage drop.

FIG. 4 illustrates the isolation circuitry between microprocessor 104 and the speed and torque control circuit 500 and between microprocessor 104 and the IC 108. Pin Pl-4 is connected to microprocessor 104 and receives the control pulses generated by microprocessor 104 having a duty cycle representing the desired speed or torque of the motor. The control pulses are provided to light emitting diode 402d of isolator 402 which activates transistor 402t to generate a representative voltage across resistor R32 and divided by resistors R35 and R36 so that the voltage is proportional to the control pulses. The time constant defined by R35/C18 is on the order of 0.25 seconds to filter ripples within the 50–200 Hz frequency range. This time constant can be designed as desired and, preferably is 5 to 10 times the period of the control pulses. This voltage is connected to the base of current amplifying transistor QO2 which has a nine volt reference signal being applied to its collector. Accordingly, the emitter of transistor QO2 provides a DC voltage signal between zero and nine volts representative of the duty cycle between 0 and 100% of the control pulses provided by microprocessor 104. Jumpers JO1 and J35 provide for a full torque range of 0 to 100%. If a maximum torque range of less than 100% is desired, jumper JO1 may be deleted and jumper JO2 inserted. The value of resistor R33 would then be adjusted to correspond to the desired maximum. If a minimum starting torque of more than 0 is desired, jumper J35 may be deleted and jumpers JO3 or JO4 may be inserted. The value of resistor R37 may then be adjusted to correspond to the desired minimum jumper JO3 would correspond to a preset minimum, such as 50%, depending, in part, on the values of R35 and R36.

Isolator 404 converts the commutation pulses provided by the COMPUL output of IC 108 into a tachometer signal to be applied to microprocessor 104. COMPUL output provides a signal representing the summation of the commutation pulses provided by ports AT, BT and CT (or AB, BB and CB) of IC 108. The base of transistor switch Q15 is biased by a +9 volt signal applied via resistor RO5 and the collector has a +9 volt reference being applied thereto. The commutation pulses are added to the biasing voltage to turn switch transistor Q15 on at each pulse activating LED 404d to turn on the transistor 404t of isolator 404 which closes the circuit between pins P1-1 and P1-2. Either of these pins may be provided with a reference voltage from microprocessor 104 so that the other pin provides a tachometer signal representative of the speed of the motor. Isolator 404 constitutes means for providing a tachometer signal representative of the motor speed to the motor control apparatus, i.e., microprocessor 104.

Figure 5:
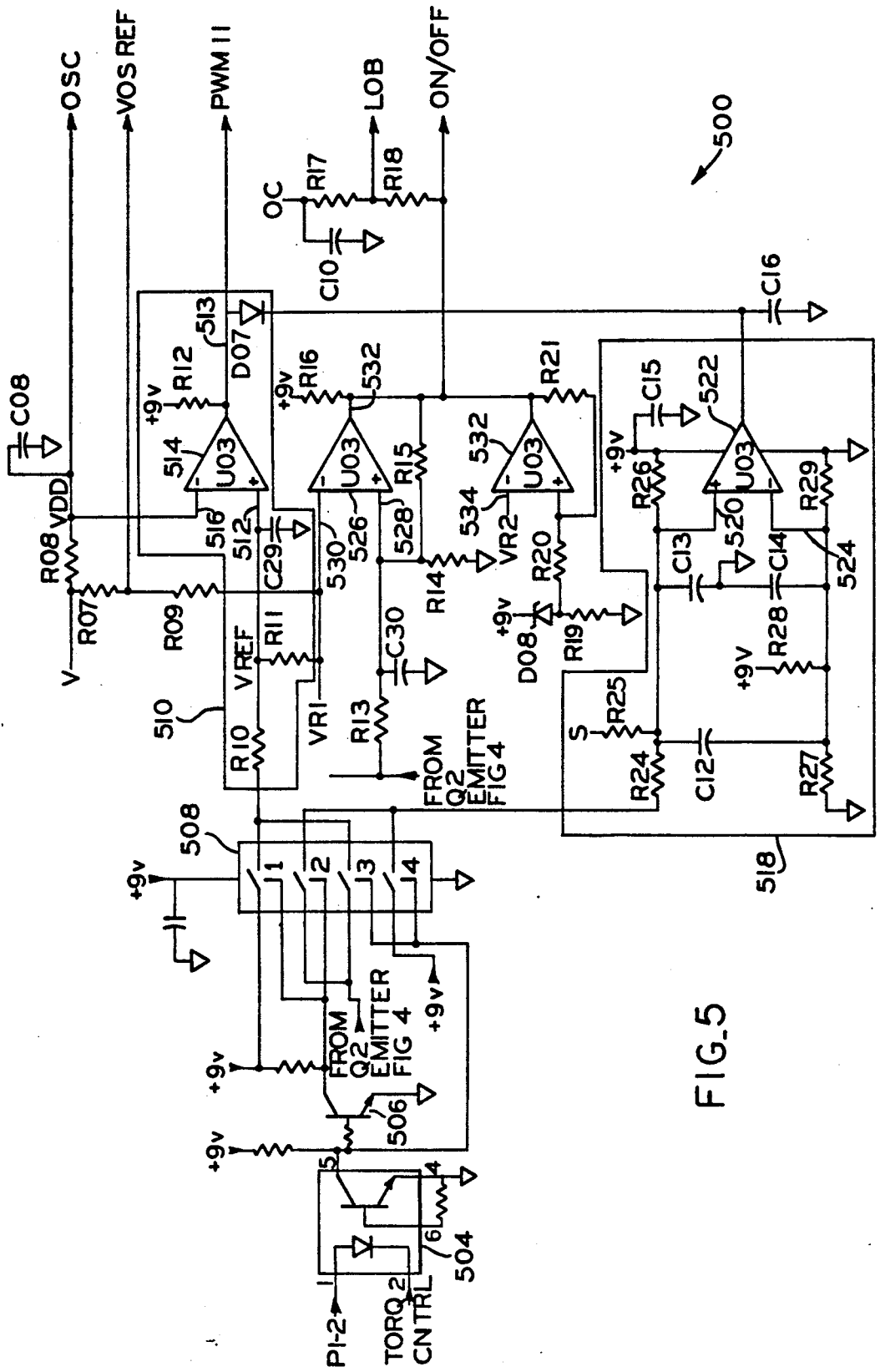
FIG. 5 is a schematic diagram of one embodiment of an speed and torque control circuit according to the invention for use as part of an electronic control for an electronically commutated motor according to the invention.

FIG. 5 illustrates one embodiment of a speed and torque control circuit generally referred to by reference character 500 including a selecting circuit 501 for selecting between speed control or torque control. Control circuit 500 controls the operation of power switches A,B,C which apply the motor voltage to the motor windings. This control is accomplished by controlling the signal applied to PWM input port 110 of IC 108 to control the average voltage applied to the motor windings. First, the torque regulation mode will be described followed by the speed regulation mode.

In the torque regulator mode, the motor current is limited to a fixed level at all speeds where it would normally exceed that level if full voltage were applied, to provide constant torque. In particular, a voltage signal is provided to pin P1-2, such as by microprocessor 104, indicating that torque regulation is desired. This voltage signal activates isolator 504 which turns off transistor 506 which causes switches 1 and 2 of switchbank 508 to close.

This results in a nine volt signal being applied to resistor R10 of motor voltage control circuit 510. This voltage is divided by resistor R11, filtered by capacitor C29 and applied to the noninverting input 512 of comparator 514. In the torque regulation mode, this voltage signal applied to noninverting input 512 is always greater than the fixed DC voltage applied to inverting input 516 (described below with regard to the speed regulation mode) so that the output of comparator 514 is always high. This results in the application of a +9 volt signal through resistor R12 to PWM input port 110 of IC 108.

In the torque regulation mode, activation of switchbank 508 also closes switch 2 which results in the emitter from transistor Q2 (FIG. 4) providing a DC voltage signal to resistor R24 of motor current control circuit 518. The net voltage on input 520 results from the voltage across resistor R24 divided by resistors R25 and R26 minus voltage on shunt resistor RO3. As noted above with regard to FIG. 4, this DC voltage signal has a magnitude which is a function of the desired operating torque of the motor. This DC voltage signal may be filtered by optional capacitor C12 and is added to a negative voltage signal representing the motor current provided by shunt S through resistor R25. In particular, the voltage signal through resistor R25 is a function of the motor current as sensed by shunt resistor RO3.

The sum of the positive current through resistor R24 and bias resistor R26 and the negative current through resistor R25 provide a voltage signal which is filtered by capacitors C13, C15 to eliminate noise and provided to the noninverting input 520 of comparator 522. A reference voltage is provided to the inverting input 524 of comparator 522. This reference voltage is generated by the nine volts applied to resistor R28 as divided by resistors R27 and R29 and filtered by capacitor C14. When the summed voltage resulting from the current through R24 minus the shunt current applied to noninverting input 520 is greater than the reference voltage applied to inverting input 524, output 526 of the comparator remains high and the +9 volt signal through resistor R12 is applied to PWM input port 110 of IC 108. In the event that the summed voltage is less than the reference voltage, output port 526 of comparator 524 goes low and is grounded. As a result, diode DO7 is no longer reverse biased resulting in PWM input port 110 being disabled (grounded) through comparator 522 and receiving no voltage signal.

Switchbank 508 constitutes means for selecting the motor current or the motor voltage as the control parameter. In the torque regulation mode, motor current control circuit 518 comprises means responsive to the motor current as the selected operating parameter for generating a PWM series of pulses. In the speed regulation mode, motor voltage control circuit 510 comprises means responsive to the motor voltage as the selected operating parameter for generating a PWM series of pulses.

Figure 6:
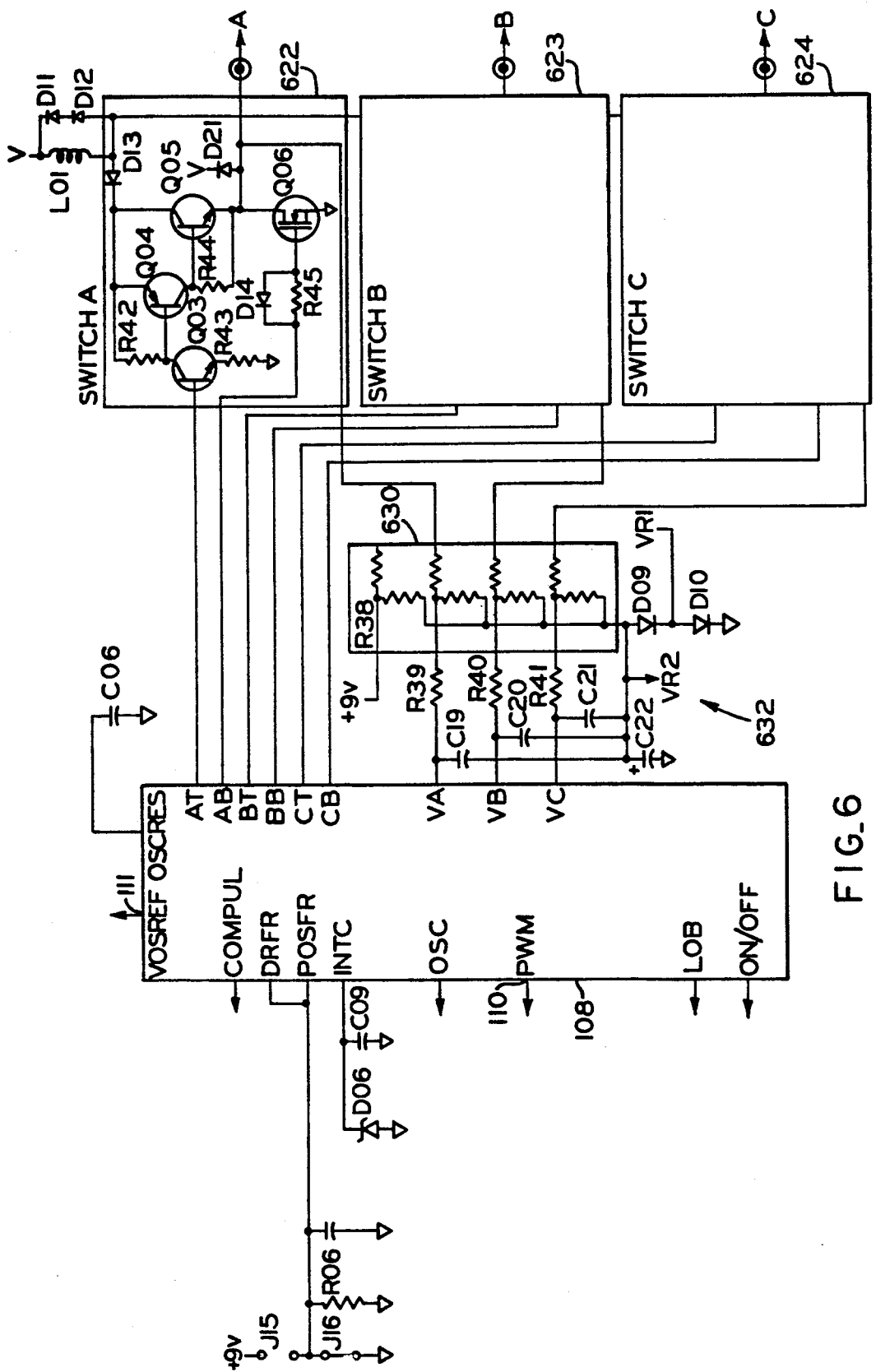
FIG. 6 is a schematic diagram of one embodiment of a motor control integrated circuit and full wave bridge according to the invention for use as part of an electronic control for an electronically commutated motor according to the invention.

Comparator 526 is part of an automatic on/off circuit which functions in both the torque and speed regulation modes. Noninverting input 528 receives the DC voltage signal from the emitter of transistor Q2 (FIG. 4). This voltage signal represents the desired operating torque, or speed in the speed regulation mode. This DC voltage signal is applied through resistor R13, filtered by capacitor C30 and divided by resistors R14 and R15 so that it is applied to the noninverting input 528. In contrast, inverting input 530 receives a voltage signal VR1 generated by the voltage divider network (FIG. 6) representing one diode voltage drop. When the divided DC voltage signal from the emitter of transistor Q2 representing the desired torque (or speed) is above the divided VR1 reference voltage, output 532 of comparator 526 remains high so that a +9 volt signal is applied through resistor R16 to the on/off input of IC 108 indicating that the IC should remain on and activated. In the event that the divided DC voltage signal representing the desired torque (or speed) falls below the divided VRI reference voltage, output 532 of comparator 526 goes low and is grounded thereby grounding the on/off input of IC 108 turning IC 108 off. Accordingly, comparator 526 functions to prevent operation of IC 108 unless the signal representing desired torque or speed is greater than a threshold value defined by the VRI reference voltage Comparator 532 is part of a power-on reset circuit. Inverting input 534 receives voltage signal VR2 which represents two diode voltage drops (1.2 volts) as generated by the voltage divider network (FIG. 6). Noninverting input 536 of comparator 532 is provided with a reference voltage which is the low voltage supply less the zener diode voltage drop across DO8. Comparator 532 enables on/off to go high if the low voltage supply is higher than VR2 added to the zener diode drop DO8.

Overcurrent voltage OC as filtered by capacitor C10 is applied through resistor R17 and divided by resistor R18 to the lockoff input (LOB) of IC 108. When overcurrent transistor switch QO1 (FIG. 3) is activated by an overcurrent condition, the lockoff input is grounded to disable IC 108 until the motor current falls below the threshold which deactivates transistor QO1. For example, when the motor current equals 1.2 amps, QO1 may be turned on to pull OC low which prevents a voltage signal through resistor R18 from being applied to the lockoff input LOB of IC 108 thereby shutting off IC 108 and the voltage applied to drive the motor windings. Thereafter, the on/off input enables the LOB input to restart driving the motor windings, i.e., if there is an overcurrent for IC 108 to reset and restart. The voltage applied through R18 pulls the LOB input back up again (to high) when QO1 is deactivated and the short it creates is cleared. Resistor R18 also serves an additional start-up function. When power is first applied to IC 108, inputs LOB and ON/OFF should go high simultaneously to avoid a logic indication that there is an overcurrent trip.

In the speed regulation mode, voltage control provides a constant speed feature in that the average DC voltage applied to the motor is held constant by switching the current on and off for a fixed period of time. In particular, isolator 504 is off so that only switches 3 and 4 of switchbank 508 are closed. Closing switch 3 applies the DC voltage signal representing the desired torque from the emitter of transistor Q2 to resistor R10 of the motor voltage control circuit 510. In the speed regulation mode, this DC voltage is divided by R11, filtered by capacitor C29 and applied to noninverting input 512. The magnitude of this voltage may not always be higher than the magnitude voltage applied to inverting input 516 of comparator 514. In particular, the motor voltage V as divided by resistors RO7 and RO9, which constitute a motor voltage sensor, provides the reference voltage for the oscillator consisting of capacitor CO8 and resistor RO8 which generate an oscillating signal in combination with internal circuitry of IC 108. This results in a triangular waveform (i.e., a saw-tooth signal) being applied to the inverting input 516 of comparator 514. The sawtooth signal will rise to its peak (preferably 4 volts) and reset upon discharge of capacitor CO8. The sawtooth signal is compared by comparator 514 to the fixed DC level applied to input 512. When the sawtooth signal representing the motor voltage is greater than the voltage signal representing the desired speed as applied to inverting input 512, the output 513 of comparator 514 goes low grounding PWM input port 110 of IC 108 and discontinuing further voltage application to the motor windings for the remainder of the oscillating cycle. As long as the DC voltage representing the desired operating speed is higher than the divided motor voltage V, the output of comparator 514 remains high so that the nine volt signal is applied via resistor R12 to PWM input port 110 of IC 108. Output 513 is applied to PWM input 110 of IC 108 to control application of motor voltage V to the motor windings. Output 513 will be high during the rise time of the sawtooth signal (see FIG. 7, reference character 708) and will be low when the ramp reaches the same value as the fixed DC level applied to input 512. This provides PWM input 110 with a square wave having a duty cycle which is a function of the duty cycle of the control pulses.

The oscillator reset (OSCRES) input of IC 108 (FIG. 6) controls the discharge time of the sawtooth signal as defined by capacitor CO6. The fixed DC level applied to input 512 is selected so that there is always a fixed off time, i.e., a period of each cycle of oscillation during which input 512 is greater than input 516 so that output 513 is low and no motor voltage V is applied to the windings. For example, during current limiting when the motor is running at a desired speed, the current is limited by the back emf generated in the motor windings. During this period the power transistors of switches A,B,C should be off to prevent these devices from being continuously on. A fixed duty cycle, such as 95%, may be selected at which point the current will be turned off and the duty cycle of the control pulses would be limited to 95%. This turn off for 5% of the oscillator period limits the maximum torque.

In the speed regulation mode, switch 4 of switchbank 508 is closed so that motor current control circuit 518 has a nine volt signal applied through resistor R24 to the noninverting input 520 of comparator 522. The current through resistor R24 is summed with the negative shunt current through resistor R25 to apply a signal representing the maximum motor current to input 520. This applied voltage is usually greater than the reference voltage applied to inverting input 524 so that the output of comparator 522 is always high. However, in the event that the motor current exceeds a maximum which is a function of the reference voltage applied to input 524, such as in the overcurrent condition, the summed voltage applied to noninverting input 520 may be less than the reference voltage applied to inverting input 524 so that output 526 is low thereby grounding PWM input 110. Accordingly, even though control circuit 500 is in the speed regulation mode, maximum motor current regulation may occur during speed regulation.

FIG. 6 illustrates the commutation circuitry. Switches 622, 623 and 624 are designed to respond to control signals supplied by IC 108 at pads AT, AB, BB, BT, CT and CB. The initial letters A, B and C designate the winding stage of motor 102. The second letter "T" denotes that "on" signals from the pads so designated on IC 108 will produce switch conduction to the 160 volt buss (T for top) in relation to system ground potential. The second letter "B" denotes that "on" signals from the pads so designated on the IC 108 will produce switch conduction to system ground (B for bottom).

The circuit of switch 622, which controls the A winding of the motor, is shown in FIG. 6. It comprises three bi-polar transistors Q3, Q4 and Q5 which function to couple the winding A to the motor voltage V when AT is high. A single FET QO6 functions to couple that winding terminal to system ground when AB is high. A, B and C are each the same and only switch A is illustrated for convenience.

Back emf position sensing from each of the windings is provided through divider network 630 to the back emf sensing input ports VA, VB and VC of IC 108. Position sensing is accomplished by integrating the back emf signal of the motor windings once it is divided down to a low level voltage by resistor network 630. At a particular volt-sec threshold, the appropriate power transistors of switches A,B,C are gated on and off through a transconductance amplifier, analog gates and a position counter which are integral to IC 108 (see U.S. Pat. No. 4,500,821). Reference character 632 refers to an optional high frequency noise filter including capacitors C19, C20, C21 and C22 and resistors R39, R40 and R41. Capacitor C9 in conjunction with limiting zener diode DO6 defines the integration interval of the back emf sensing which, in general, depends upon number of poles in motor, number of turns in motor windings, inductance of motor windings and level of current through motor windings.

For a complete description of the operation of the switches and IC 108, reference is made to coassigned U.S. Pat. No. 4,500,821, incorporated herein by reference.

Figure 7:
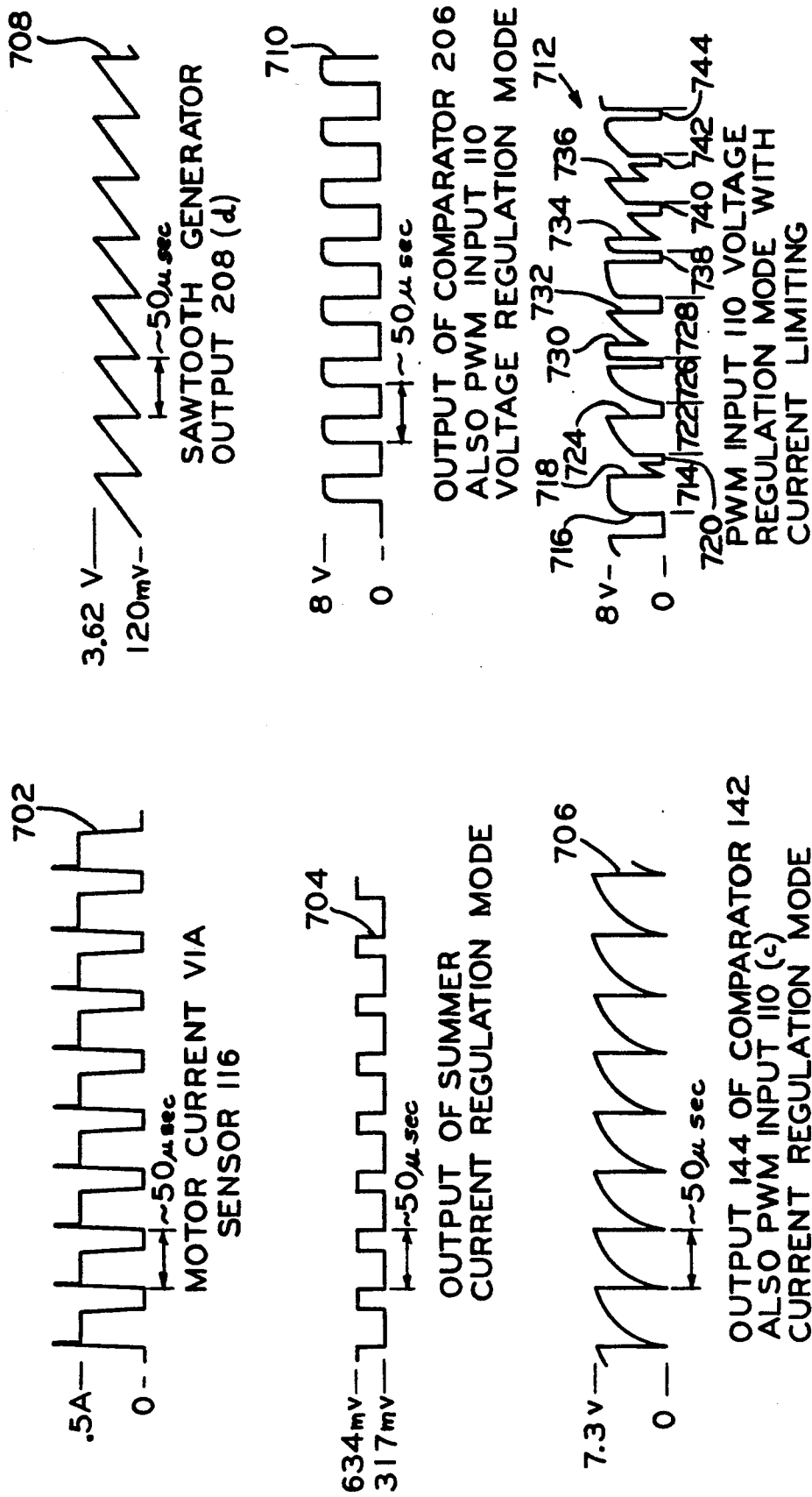
FIG. 7 is a set of waveform diagrams illustrating the operation of a draft inducer apparatus having an electronically commutated motor system including an electronic torque control according to the invention.

FIG. 7 illustrates various waveforms as labeled in FIGS. 1 and 2. One oscillation period equals approximately 50 microseconds. This corresponds to a frequency which is maintained at 20 KHz to avoid audible noise. As shown by reference character 702, the shunt current rises to a flat peak value and falls within the 50 microsecond period. The spike at the beginning of each cycle results from the commutation current necessary to turn off flyback diodes D15, D18, D21 and FET body diodes. The time between the flat peak and the end of the 50 microsecond period is off time until the logic of IC 108 is reset at the end of the oscillation period. If, in the torque control mode, the motor current never reaches the 0.6 amp peak, pulse width modulation is never turned off. The flat peak value of the motor current is defined by the value of shunt resistor R3 (0.5 ohms) and the DC voltage signal provided to resistor R24 of motor current control circuit 518 from the emitter of transistor QO2. During each oscillation period, the motor current provided via sensor 116 varies from a value of approximately 0.6 amps to 0 amps depending on the point in time within the period that the motor current exceeds the desired limit corresponding to the desired torque.

The output (b) of summer 140 in the current regulation mode (FIG. 1) is illustrated by reference character 704 and varies between a high of 634 millivolts and a low of 317 millivolts depending on the difference between the sum of the sensed motor current provided by sensor 116 and the desired operating torque as represented by the dc voltage provided via resistor R24. In the torque regulation mode, output (b) of summer 140 varies according to the desired operating torque and the motor current. In the voltage regulation mode, output (b) varies according to the motor current only because a constant 634 mv signal is applied to input 136 (see FIG. 2).

In the torque regulation mode, output 144 of comparator 142 varies between ground and 7.3 volts. This sawtooth waveform (c) is referred to by reference character 706. When the output 142 of comparator 144 goes low, PWM input port 110 is grounded. When the output 142 goes high, the voltage applied to PWM input port 110 ramps upward to 7.3 volts in a non-linear manner because of the time required to charge capacitor C16.

As illustrated by reference character 708, the output (d) of sawtooth generator 243 which is provided to the inverting input 516 of comparator 514 is defined by resistor RO8 and capacitor CO8 and varies from a low of 120 millivolts at discharge of capacitor CO8 and ramping upward to a high of 3.62 volts as capacitor CO8 recharges. Reference character 710 illustrates the waveform at output 513 of comparator 514 as applied to PWM input port 110 in the voltage regulation mode. This output varies between zero and eight volts and is zero during the portion of the oscillation period when sawtooth signal 708 is greater than the signal representing the desired speed as generated by converter 134.

Reference character 712 illustrates the waveform at PWM input port 110 in the voltage regulation mode when current limiting by comparator 142 also occurs during the oscillation periods. Generally, the voltage regulation occurs during the initial portion of the oscillation period and dominates until the voltage threshold is reached and the voltage regulation is shut down or until current regulation occurs to discharge capacitor C16. Initially, during oscillation period 714, voltage V is applied to the motor as voltage regulation begins at point 716. At point 718, current regulation occurs to discharge capacitor C16. Then, voltage regulation again takes over as capacitor C16 recharges. Application of voltage V to the motor is interrupted during zero period 720 when the voltage threshold is reached and voltage regulation is shut down. During oscillation period 722, voltage regulation occurs as capacitor C16 recharges. However, at point 724 current regulation occurs briefly to discharge C16 and for the remainder of period 722 the application of voltage V to the motor is interrupted because the voltage threshold has been reached. During oscillation period 726, only voltage regulation occurs as capacitor C16 recharges. At the end of period 726, the voltage regulation shuts down because the voltage threshold is again reached. During oscillation period 728, voltage regulation occurs until point 730 when current regulation partially discharges C16. Then, capacitor C16 recharges under voltage regulation until point 732 when the voltage threshold is again reached and the voltage regulation is shut down. Reference characters 734 and 736 indicate points at which current regulation discharges capacitor C16. Reference characters 738, 740, 742 and 744 indicate zero periods during which the voltage threshold is reached and the voltage regulation is shut down.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A control system for an electronically commutated motor having a stationary assembly with a plurality of winding stages for carrying a motor current in response to application of a voltage having a magnitude subject to variations, the motor further having a rotatable assembly, and which control system is adapted to receive control pulses having a duty cycle representing a desired operating torque for the motor, the control system for use with a commutating circuit for controlling power switching devices for applying the voltage to one or more of the winding stages at a time having a duty cycle which is a function of a pulsed signal and for commutating the winding stages in a preselected sequence to rotate the rotatable assembly, the control system comprising:

means responsive to the motor current for generating a pulse width modulated (PWM) series of pulses having a pulse repetition rate having a duty cycle which is a function of the duty cycle of the control pulses, the generating means adapted to supply the PMW series of pulses to the commutating circuit as the pulsed signal;

means for comparing the applied voltage to a reference voltage; and means, responsive to the means for comparing, for increasing the duty cycle of the PWM series of pulses as a function of decreases in the applied voltage and for decreasing the duty cycle of the PWM series of pulses as a function of increases in the applied voltage whereby the operating torque of the motor is a function of the duty cycle of the control pulse and is substantially independent of variations in the magnitude of the applied voltage.

2. The system of claim 1 wherein said means for comparing comprises a comparator adapted to compare the applied voltage to an oscillating voltage signal and to provide a comparator output signal in response thereto, and a latch, responsive to the comparator output signal, adapted to inhibit the PWM series of pulses during the period that the oscillating voltage signal is greater than the applied voltage.

3. The system of claim 1 further comprising means for generating a sum of a first voltage having a magnitude which is a function of the duty cycle of the control pulses and a second voltage having a magnitude which is a function of the motor current, and means for inhibiting the PWM series of pulses during the period that the sum is greater than the reference voltage.

4. The system of claim 1 wherein said means for generating comprises means for comparing the motor current and a signal representing the duty cycle of the control pulses and providing an output signal in response thereto, and means for providing a series of pulses as the PWM series of pulses, each pulse having a width which is a function of the output signal of the means for comparing the motor current.

5. The system of claim 4 wherein said means for comparing the motor current comprises means for generating a first voltage having a magnitude which is a function of the duty cycle of the control pulses, means for generating a second voltage having a magnitude which is a function of the motor current, means for summing the first and second voltages, and means for comparing the sum to a reference voltage to provide an output signal in response thereto as the PWM series of pulses.

6. The system of claim 5 further comprising means, responsive to the means for comparing the sum, for selectively inhibiting the PWM series of pulses during the period that the sum is greater than the reference voltage.

7. The system of claim 6 wherein said means for comparing the sum comprises a comparator adapted to compare the sum to the reference voltage and to provide a comparator output signal in response thereto, and said means for selectively inhibiting comprises means, responsive to the comparator output signal, for conducting the PWM voltage away from said commutating circuit during the period that the sum is less than the reference voltage.

8. The system of claim 7 wherein said means for generating a first voltage comprises a dc level converter, said means for generating a second voltage comprises a motor current shunt, said means for summing comprises a summer and said means for conducting comprises a diode.

9. The system, of claim 8 wherein said means for increasing and decreasing comprises means, responsive to the means for comparing the applied voltage to a reference voltage, for increasing the duty cycle of the PWM series of pulses when the applied voltage decreases and for decreasing the duty cycle of the PWM series of pulses when the applied voltage increases.

10. The system of claim 9 wherein said means for comparing the applied voltage to a reference voltage comprises a comparator adapted to compare the applied voltage to an oscillating voltage signal and to provide a comparator output signal in response thereto, and a latch, responsive to the comparator output signal, adapted to inhibit the PWM series of pulses during the period that the oscillating voltage signal is greater than the applied voltage.

11. A control system for an electronically commutated motor having a stationary assembly with a plurality of winding stages for carrying a motor current in response to application of a voltage having a magnitude subject to variations, the motor further having a rotatable assembly, and which control system is adapted to receive control pulses having a duty cycle representing a desired operating torque for the motor, the control system for use with a commutating circuit for controlling power switching devices for applying the voltage to one or more of the winding stages at a time having a duty cycle which is a function of a pulsed signal and for commutating the winding stages in a preselected sequence to rotate the rotatable assembly, the control system comprising:

means for generating a pulse width modulated (PWM) series of pulses having a duty cycle which is a function of the duty cycle of the control pulses, the generating means adapted to supply the PWM series of pulses to the commutating circuit as the pulsed signal;

means for comparing the applied voltage to a reference voltage; and means, responsive to the means for comparing, for increasing the duty cycle of the PWM series of pulses as a function of decreases in the applied voltage and for decreasing the duty cycle of the PWM series of pulses as a function of increases in the applied voltage whereby the operating speed of the motor is a function of the duty cycle of the control pulses and is substantially independent of variations in the magnitude of the applied voltage.

12. The system of claim 11 wherein said means for comparing comprises a comparator adapted to compare the applied voltage to an oscillating voltage signal and to provide a comparator output signal in response thereto, and a latch, responsive to the comparator output signal, adapted to inhibit the PWM series of pulses during the period that the oscillating voltage signal is greater than the applied voltage.

13. The system of claim 11 wherein said means for generating comprises means for comparing an oscillating reference signal and a signal representing the duty cycle of the control pulses and providing an output signal in response thereto as the PWM series of pulses.

14. The system of claim 13 wherein said means for comparing the applied voltage to a reference voltage comprises means for generating a first voltage having a magnitude which is a function of the duty cycle of the control pulses, means for generating a second voltage having a magnitude which is a function of the oscillating reference signal, means for comparing the first and second voltages and generating an output signal representative thereof as the PWM series of pulses.

15. The system of claim 14 wherein said means for comparing the first and second voltages comprises a comparator adapted to compare the magnitudes of the first and second voltages and adapted to provide a comparator output signal in response thereto.

16. The system of claim 15 wherein said means for generating a first voltage comprises a dc level converter and said means for generating a second voltage comprises a motor voltage sensor.

17. The system of claim 11 wherein said means for generating is responsive to the motor current.

18. The system of claim 17 wherein said means for comparing comprises a comparator adapted to compare the applied voltage to an oscillating voltage signal and to provide a comparator output signal in response thereto, and a latch, responsive to the comparator output signal, adapted to inhibit the PWM series of pulses during the period that the oscillating voltage signal is greater than the applied voltage.

19. The system of claim 18 wherein said means for generating comprises means for comparing the motor current and a current reference signal and providing an output signal in response thereto to inhibit the PWM series of pulses whenever the the motor current is greater than the current reference signal.

20. The system of claim 19 wherein said means for comparing the applied voltage to a reference voltage comprises means for generating a first voltage having a magnitude which is a function of the current reference signal, means for generating a second voltage having a magnitude which is a function of the motor current, means for summing the first and second voltages, means for comparing the sum to a reference providing an output signal in response thereto as the PWM series of pulses.

21. The system of claim 20 further comprising means, responsive to the means for comparing the sum, for inhibiting the PWM series of pulses during the period that the sum is greater than the reference voltage.

22. The system of claim 21 wherein said means for comparing the sum comprises a comparator adapted to compare the sum to the reference voltage and to provide a comparator output signal in response thereto, and said means for inhibiting comprises means, responsive to the comparator output signal, for conducting the PWM series of pulses away from said commutating circuit during the period that the sum is less than the reference voltage.

23. The system of claim 22 wherein said means for generating a first voltage comprises a dc voltage source, said means for generating a second voltage comprises a motor current shunt, said means for summing comprises a summer and said means for conducting comprises a diode.

24. The system of claim 11 further comprising a motor control apparatus adapted to control the motor by generating the control pulses having a duty cycle which is a function of a desired operating torque for the motor and the speed of the motor and further including means for providing a tachometer signal representative of the motor speed to the motor control apparatus whereby the control pulses are a function of the tachometer signal.

25. The system of claim 11 wherein the control pulses represent a desired operating torque or speed of the motor; further comprising means for selecting the motor current or the motor voltage as a control parameter; and wherein said means for generating is responsive to the selected motor operating condition.

26. The system of claim 11 further comprising means for generating a sum of a first voltage having a magnitude which is a function of the duty cycle of the control pulses and a second voltage having a magnitude which is a function of the motor current, and means for inhibiting the PWM series of pulses during the period that the sum is greater than the reference voltage.

27. A control system for power switching devices of an electronically commutated motor having a stationary assembly with a plurality of winding stages for carrying a motor current in response to application of a voltage having a magnitude subject to variations, the motor further having rotatable assembly, and which control system is adapted to receive control pulses having a duty cycle representing a desired operating torque for the motor, the control system comprising:

means for controlling the power switching devices to apply a voltage having a duty cycle which is a function of a pulsed signal to one or more of the winding stages at a time and for commutating the winding stages in a preselected sequence to rotate the rotatable assembly;

means responsive to the motor current for generating a pulse width modulated (PWM) series of pulses having a duty cycle which is a function of the duty cycle of the control pulses, the generating means adapted to supply the PWM series of pulses to the controlling means as the pulsed signal;

means for comparing the applied voltage to a reference voltage; and means, responsive to the means for comparing, for increasing the duty cycle of the PWM series of pulses as a function of decreases in the applied voltage and for decreasing the duty cycle of the PWM series of pulses as a function of increases in the applied voltage whereby the operating torque of the motor is a function of the duty cycle of the control pulses and is substantially independent of variations in the magnitude of the applied voltage.

28. The system of claim 27 wherein said means for generating comprises means for comparing the motor current and a signal representing the duty cycle of the control pulses and providing an output signal in response thereto, and means for providing a series of pulses as the PWM series of pulses, each pulse having a width which is a function of the output signal of the means for comparing the motor current.

29. The system of claim 27 further comprising means for generating a sum of a first voltage having a magnitude which is a function of the duty cycle of the control pulses and a second voltage having a magnitude which is a function of the motor current, and means for inhibiting the PWM series of pulses during the period that the sum is greater than the reference voltage.

30. A control system for power switching devices of an electronically commutated motor having a stationary assembly with a plurality of winding stages for carrying a motor current in response to applications of a voltage having a magnitude subject to variations, the motor further having a rotatable assembly, and which control system is adapted to receive control pulses having a duty cycle representing a desired operating speed for the motor, the control system comprising:

means for controlling the power switching devices to apply a voltage having a duty cycle which is a function of a pulsed signal to one or more of the winding stages at a time and for commutating the winding stages in a preselected sequence to rotate the rotatable assembly;

means for generating a pulse width modulated (PWM) series of pulses having a duty cycle which is a function of the duty cycle of the control pulses, the generating means adapted to supply the PWM series of pulses to the controlling means as the pulsed signal; means for comparing the applied voltage to a reference voltage; and means, responsive to the means for comparing, for increasing the duty cycle of the PWM series of pulses as a function of decreases in the applied voltage and for decreasing the duty cycle of the PWM series of pulses as a function of increases in the applied voltage whereby the operating speed of the motor is a function of the duty cycle of the control pulses and is substantially independent of variations in the magnitude of the applied voltage.

31. The system of claim 30 wherein said means for generating comprises means for comparing an oscillating reference signal and a signal representing the duty cycle of the control pulses and providing an output signal in response thereto as the PWM series of pulses.

32. The system of claim 30 wherein said means for generating is responsive to the motor current.

33. The system of claim 32 wherein said means for generating comprises means for comparing the motor current and a current reference signal and providing an output signal in response thereto to inhibit the PWM series of pulses whenever the the motor current is greater than the current reference signal.

34. A control system for an electronically commutated motor having a stationary assembly with a plurality of winding stages for carrying a motor current in response to application of a voltage having a magnitude subject to variations, the motor further having a rotatable assembly, which control system is responsive to a motor control apparatus adapted to control the motor by generating control pulses having a duty cycle which is a function of a desired operating torque for the motor and the speed of the motor, the control system comprising:

means for applying a voltage having a duty cycle which is a function of a pulsed signal to one or more of the winding stages at a time and for commutating the winding stages in a preselected sequence to rotate the rotatable assembly;

means responsive to the motor current for generating a pulse width modulated (PWM) series of pulses having a duty cycle which is a function of the duty cycle of the control pulses, the generating means adapted to supply the PWM series of pulses to the applying means as the pulsed signal; and means for providing a tachometer signal representative of the motor speed to the motor control apparatus.

35. The system of claim 34 wherein the tachometer signal providing means comprises an isolator adapted to receive commutation pulses from said generating means and adapted to provide the tachometer signal in response to the commutation pulses.

36. The system of claim 35 further including means for varying the duty cycle of the applied voltage inversely as a function of variations in the magnitude of the applied voltage.

37. The system of claim 36 wherein said means for varying comprises means for comparing the applied voltage to a reference voltage, and means, responsive to the means for comparing, for increasing the duty cycle of the PWM series of pulses when the applied voltage decreases and for decreasing the duty cycle of the PWM series of pulses when the applied voltage increases.

38. The system of claim 37 wherein said means for generating comprises means for comparing the motor current and a signal representing the duty cycle of the control pulses and providing an output signal in response thereto, and means for providing a series of pulses as the PWM series of pulses, each pulse having a width which is a function, of the output signal of the means for comparing the motor current.

39. The system of claim 35 wherein said means for generating comprises means for comparing the motor current and a signal representing the duty cycle of the control pulses and providing an output signal in response thereto, and means for providing a series of pulses as the PWM series of pulses, each pulse having a width which is a function of the output signal of the means for comparing.

40. The system of claim 34 further comprising means for generating a sum of a first voltage having a magnitude which is a function of the duty cycle of the control pulses and a second voltage having a magnitude which is a function of the motor current, and means for inhibiting the PWM series of pulses during the period that the sum is greater than a reference voltage.

41. A control system for an electronically commutated motor having a stationary assembly with a plurality of winding stages for carrying a motor current in response to application of a voltage having a magnitude subject to variations, the motor further having a rotatable assembly, which control system is responsive to a motor control apparatus adapted to control the motor by generating control pulses having a duty cycle which is a function of a desired operating torque for the motor and the speed of the motor, the control system comprising:

means for applying a voltage having a duty cycle which is a function of a pulsed signal to one or more of the winding stages at a time and for commutating the winding stages in a preselected sequence to rotate the rotatable assembly;

means for varying the duty cycle of the applied voltage as an inverse function of the magnitude of the applied voltage;

means for generating a pulse width modulated (PWM) series of pulses having a duty cycle which is a function of the duty cycle of the control pulses, the generating means adapted to supply the PWM series of pulses to the applying means as the pulsed signal; and means for providing a tachometer signal representative of the motor speed to the motor control apparatus.

42. The system of claim 41 wherein said means for varying comprises means for comparing the applied voltage to a reference voltage, and means, responsive to the means for comparing, for increasing the duty cycle of the PWM series of pulses when the applied voltage decreases and for decreasing the duty cycle of the PWM series of pulses when the applied voltage increases.

43. The system of claim 42 wherein said means for generating comprises means for comparing an oscillating reference signal and a signal representing the duty cycle of the control pulses and providing an output signal in response thereto as the PWM series of pulses.

44. The system of claim 42 wherein said means for generating is responsive to the motor current.

45. The system of claim 44 wherein said means for generating comprises means for comparing the motor current and a current reference signal and providing an output signal in response thereto to inhibit the PWM series of pulses whenever the the motor current is greater than the current reference signal.

46. The system of claim 41 further comprising means for generating a sum of a first voltage having a magnitude which is a function of the duty cycle of the control pulses and a second voltage having a magnitude which is a function of the motor current, and means for inhibiting the PWM series of pulses during the period that the sum is greater than a reference voltage.

47. A control system for an electronically commutated motor having a stationary assembly with a plurality of winding stages for carrying a motor current and further having a rotatable assembly, and which control system is adapted to receive control pulses having a duty cycle representing a desired operating torque or speed for the motor, the control system being adapted for use with a commutating circuit for applying a voltage to one or more of the winding stages at a time in accordance with a pulsed signal and for commutating the winding stages in a preselected sequence to rotate the rotatable assembly, the control system comprising:

means for selecting the motor current or the motor voltage as a control parameter said selecting means including means for sensing the motor current and means for providing a reference;

means responsive to the selected motor operating parameter for generating a pulse width modulated (PWM) series of pulses having a duty cycle which is a function of the duty cycle of the control pulses, the generating means adapted to supply the PWM series of pulses to the commutating circuit as the pulsed signal whereby the torque of the motor is a function of the duty cycle of the control pulses when the motor current is selected as the control parameter and the speed of the motor is a function of the duty cycle of the control pulses when the motor voltage is selected as the control parameter.

48. The system of claim 47 wherein said means for generating comprises means responsive to the motor current for generating a pulse width modulated (PWM) series of pulses having a duty cycle which is a function of the duty cycle of the control pulses when the motor current is selected as the control parameter by said means for selecting, the generating means adapted to supply the PWM series of pulses to the commutating circuit as the pulsed signal whereby the operating torque of the motor is a function of the duty cycle of the control pulses and is substantially independent of variations in the magnitude of the applied voltage.

49. The system of claim 47 wherein said means for generating comprises means for generating a pulse width modulated (PWM) series of pulses having a duty cycle which is a function of the duty cycle of the control parameter by said means for selecting, the generating means adapted to supply the PWM series of pulses to the commutating circuit as the pulsed signal whereby the operating speed of the motor is a function of the duty cycle of the control pulses and is substantially independent of variations in the magnitude of the applied voltage.

50. The system of claim 47 further comprising means for providing a tachometer signal representative of the motor speed and wherein said means for generating is responsive to said means for providing a tachometer signal to provide the PWM series of pulses having a duty cycle varying as a function of the tachometer signal.

51. The system of claim 47 wherein said means for selecting comprises means for switching between said means for sensing the motor current and said means for providing a reference; and said means for generating comprises: means for comparing a signal representative of the duty cycle of the control pulses to a signal representative of the motor current when said means for switching is connected to said means for sensing the motor current; and means for comparing a signal representative of the duty cycle of the control pulses to an oscillating reference signal when said means for switching is connected to said means for providing a reference.

52. The system of claim 51 wherein said means for generating further comprises means for comparing a reference signal representative of the maximum motor current to a signal representative of the motor current when said means for switching is connected to said means for sensing the motor current.

53. The system of claim 47 wherein said means for generating comprises means for comparing a signal representative of the duty cycle of the control pulses to a signal representative of the motor current when the motor current is selected as the control parameter by said means for selecting and means for comparing a signal representative of the duty cycle of the control pulses to an oscillating reference signal representative of the maximum duty cycle of the voltage to be applied to the motor when the motor voltage is selected as the control parameter by said means for selecting.

54. Draft inducer apparatus for use with a combustion chamber having an exhaust outlet comprising:

a fan for moving air through the exhaust outlet and thereby to induce a draft in the combustion chamber;

an electronically commutated motor including a stationary armature having a core and at least two energizable winding stages arranged to establish a predetermined number of magnetic poles, and a permanent magnet rotor coupled to said fan and adapted to rotate in response to the magnetic poles established by said winding stages;

means for generating a pulse width modulated (PWM) series of pulses having a duty cycle representing a desired torque or speed of the motor;

power switching devices for applying a voltage to one or more of said winding stages at a time; and means for controlling said power switching devices in accordance with the PWM series of pulses and commutating said winding stages in a preselected sequence to rotate said permanent magnet rotor and said fan;

sensor means for sensing pressure within the exhaust outlet, said means for generating further comprising means connected to said sensor means for generating the PWM series of pulses with a duty cycle varying as a function of the sensed pressure.

55. The system of claim 54 wherein said means for generating comprises means for generating control pulses having a duty cycle representing a desired operating torque for the motor; means for varying the duty cycle of the applied voltage inversely as a function of variations in the magnitude of the applied voltage; and means responsive to the motor current for generating a pulse width modulated (PWM) series of pulses having a duty cycle which is a function of the duty cycle of the control pulses, the generating means adapted to supply the PWM series of pulses to the power switching devices as the pulsed signal whereby the operating torque of the motor is a function of the duty cycle of the control pulses and is substantially independent of variations in the magnitude of the applied voltage.

56. The system of claim 54 wherein said means for generating comprises means for generating control pulses having a duty cycle representing a desired operating speed for the motor; means for varying the duty cycle of the applied voltage varies inversely as a function of variations in the magnitude of the applied voltage; and means for generating a pulse width modulated (PWM) series of pulses having a duty cycle which is a function of the duty cycle of the control pulses, the generating means adapted to supply the PWM series of pulses to the power switching devices as the pulsed signal whereby the operating speed of the motor is a function of the duty cycle of the control pulses and is substantially independent of variations in the magnitude of the applied voltage.

57. The system of claim 54 wherein said generating means generates the PWM series of pulses when the pressure is above a preselected limit, whereby a draft is induced in the combustion chamber when the pressure is above the preselected limit.

58. The apparatus of claim 54 further comprising means for providing a tachometer signal representative of the motor speed and wherein said means for generating is responsive to said means for providing a tachometer signal to provide the series of pulses having a duty cycle varying as a function of the sensed pressure and the tachometer signal.

59. The system of claim 54 further comprising means for generating a sum of a first voltage having a magnitude which is a function of the duty cycle of the control pulses and a second voltage having a magnitude which is a function of the motor current, and means for inhibiting the PWM series of pulses during the period that the sum is greater than a reference voltage.

60. Draft inducer apparatus for use with a combustion chamber having an exhaust outlet, comprising:
a fan for moving air through the exhaust outlet and thereby to induce a draft in the combustion chamber;
an electronically commutated motor including a stationary armature having a core and at least two energizable winding stages arranged to establish a predetermined number of magnetic poles, and a permanent magnet motor coupled to said fan and adapted to rotate in response to the magnetic poles established by said winding stages;
means for providing a tachometer signal representative of the motor speed;
storage means for storing a speed/torque profile of the motor;
means, responsive to said means for providing a tachometer signal and said storage means, for generating a pulse width modulated (PWM) series of pulses having a duty cycle varying as a function of the motor speed/torque profile and the tachometer signal;
power switching devices for applying a voltage to one or more of said winding stages at a time;
means for controlling said power switching devices in accordance with the PWM series of pulses and commutating said winding stages in a preselected sequence to rotate said permanent magnet rotor and said fan.

61. The apparatus of claim 60 further comprising sensor means for sensing pressure within the exhaust outlet and wherein said means for generating comprises means connected to said sensor means for generating a pulse width modulated (PWM) series of pulses having a duty cycle varying as a function of the pressure.

62. The system of claim 61 wherein said generating means generates the PWM series of pulses when the pressure is above a preselected limit, whereby a draft is induced in the combustion chamber when the pressure is above the preselected limit.

63. The apparatus of claim 61 wherein said means for generating is responsive to said means for providing a tachometer signal to provide the series of pulses having a duty cycle varying as a function of the pressure and the tachometer signal.

64. The system of claim 60 wherein said means for generating comprises means for generating control pulses having a duty cycle representing a desired operating torque for the motor; means for varying the duty cycle of the applied voltage inversely as a function of variations in the magnitude of the applied voltage; and means responsive to the motor current for generating a pulse width modulated (PWM) series of pulses having a duty cycle which is a function of the duty cycle of the control pulses, the generating means adapted to supply the PWM series of pulses to the power switching devices as the pulsed signal whereby the operating torque of the motor is a function of the duty cycle of the control pulses and is substantially independent of variations in the magnitude of the applied voltage.

65. The system of claim 60 wherein said means for generating comprises means for generating control pulses having a duty cycle representing a desired operating speed for the motor; means for varying the duty cycle of the applied voltage varies inversely as a function of variations in the magnitude of the applied voltage; and means for generating a pulse width modulated (PWM) series of pulses having a duty cycle which is a function of the duty cycle of the control pulses, the generating means adapted to supply the PWM series of pulses to the power switching devices as the pulsed signal whereby the operating speed of the motor is a function of the duty cycle of the control pulses and is substantially independent of variations in the magnitude of the applied voltage.

66. The system of claim 60 further comprising means for generating a sum of a first voltage having a magnitude which is a function of the duty cycle of the control pulses and a second voltage having a magnitude which is a function of the motor current, and means for inhibiting the PWM series of pulses during the period that the sum is greater than a reference voltage.

67. A control method for an electronically commutated motor having a stationary assembly with a plurality of winding stages for carrying a motor current in response to application of a voltage having a rotatable assembly, and which control method is responsive to control pulses having a duty cycle representing a desired operating torque for the motor, the control method for use with a commutating circuit for controlling power switching devices for applying the voltage to one or more of the winding stages at a time having a duty cycle which is a function of a pulsed signal and for commutating the winding stages in a preselected sequence to rotate the rotatable assembly, the control method comprising the steps of:

generating a response to the motor current a pulse width modulated (PWM) series of pulses having a pulse repetition rat having a duty cycle which is a function of the duty cycle of the control pulses, the generating step adapted to supply the PWM series of pulses to the commutating circuit as the pulsed signal;

comparing the applied voltage to a reference voltage;

increasing the duty cycle of the PWM series of pulses as a function of decreases in the applied voltage; and decreasing the duty cycle of the PWM series of pulses as a function of increases in the applied voltage whereby the operating torque of the motor is a function of the duty cycle of the control pulses and is substantially independent of variations in the magnitude of the applied voltage.

68. A control method for an electronically commutated motor having a stationary assembly with a plurality of winding stages for carrying a motor current in response to application of a voltage having a magnitude subject to variations, the motor further having a rotatable assembly, and which control method is responsive to control pulses having a duty cycle representing a desired operating torque for the motor, the control method for use with a commutating circuit for controlling power switching devices for applying the voltage to one or more of the winding stages at a time having a duty cycle which is a function of a pulsed signal and for commutating the winding stages in a preselected sequence to rotate the rotatable assembly, the control method comprising the steps of:

generating a pulse width modulated (PWM) series of pulses having a duty cycle which is a function of the duty cycle of the control pulses, the generating step adapted to supply the PWM series of pulses to the commutating circuit as the pulsed signal;

comparing the applied voltage to a reference voltage;

increasing the duty cycle of the PWM series of pulses as a function of decreases in the applied voltage; and decreasing the duty cycle of the PWM series of pulses as a function of increases in the applied voltage whereby the operating speed of the motor is a function of the duty cycle and is substantially independent of variations in the magnitude of the applied voltage.

69. A control method for power switching devices of an electronically commutated motor having a stationary assembly with a plurality of winding stages for carrying a motor current in response to application of a voltage having a magnitude subject to variations, the motor further having a rotatable assembly, and which control method is responsive to control pulses having a duty cycle representing a desired operating torque for the motor, the control method comprising the steps of:

controlling the power switching devices to apply a voltage having a duty cycle which is a function of a pulsed signal to one or more of the winding stages at a time;

commutating the winding stages in a preselected sequence to rotate the rotatable assembly;

generating in response to the motor current a pulse width modulated (PWM) series of pulses having a duty cycle which is a function of the duty cycle of the control pulses, the generating step adapted to supply the PWM series of pulses as the pulsed signal;

comparing the applied voltage to a reference voltage;

increasing the duty cycle of the PWM series of pulses as a function of decreases in the applied voltage; and decreasing the duty cycle of the PWM series of pulses as a function of increases in the applied voltage whereby the operating torque of the motor is a function of the duty cycle of the control pulses and is substantially independent of variations in the magnitude of the applied voltage.

70. A control method for power switching devices of an electronically commutated motor having a stationary assembly with a plurality of winding stages for carrying a motor current in response to application of a voltage having a magnitude subject to variations, the motor further having a rotatable assembly, and which control method is responsive to control pulses having a duty cycle representing a desired operating speed for the motor, the control method comprising the steps of:

controlling the power switching devices to apply a voltage having a duty cycle which is a function of a pulsed signal to one or more of the winding stages at a time;

commutating the winding stages in a preselected sequence to rotate the rotatable assembly;

generating a pulse width modulated (PWM) series of pulses having a duty cycle which is a function of the duty cycle of the control pulses, the generating step adapted to supply the PWM series of pulses as the pulsed signal;

comparing the applied voltage to a reference voltage;

increasing the duty cycle of the PWM series of pulses as a function of decreases in the applied voltage; and decreasing the duty cycle of the PWM series of pulses as a function of increases in the applied voltage whereby the operating speed of the motor is a function of the duty cycle of the control pulses and is substantially independent of variations in the magnitude of the applied voltage.

71. A control method for an electronically commutated motor having a stationary assembly with a plurality of winding stages for carrying a motor current in response to application of a voltage having a magnitude subject to variations, the motor further having a rotatable assembly, and which control method is responsive to a motor control apparatus adapted to control the motor by generating control pulses having a duty cycle which is a function of a desired operating torque for the motor and the speed of the motor, the control method comprising the steps of:

applying a voltage having a duty cycle which is a function of a pulsed signal to one or more of the winding stages at a time;

storing a speed/torque profile of the motor;

commutating the winding stages in a preselected sequence to rotate the rotatable assembly;

generating, in response to the motor current and the motor speed, a pulse width modulated (PWM) series of pulses having a duty cycle which is a function of the duty cycle of the control pulses, the generating step adapted to supply the PWM series of pulses as the pulsed signal;

providing a tachometer signal representative of the motor speed to the motor control apparatus; and wherein the generating step is responsive to the storing step and the providing step for generating the PWM series of pulses with a duty cycle varying as a function of the motor speed/torque profile and the tachometer signal.

72. A control method for an electronically commutated motor having a stationary assembly with a plurality of winding stages for carrying a motor current in response to application of a voltage having a magnitude subject to variations, the motor further having a rotatable assembly, and which control method is responsive to a motor control apparatus adapted to control the motor by generating control pulses having a duty cycle which is a function of a desired operating torque for the motor and the speed of the motor, the control method comprising the steps of:
applying a voltage having a duty cycle which is a function of a pulsed signal to one or more of the winding stages at a time;
commutating the winding stages in a preselected sequence to rotate the rotatable assembly;
varying the duty cycle of the applied voltage as an inverse function of the magnitude of the applied voltage;
generating a pulse width modulated (PWM) series of pulses having a duty cycle which is a function of the duty cycle of the control pulses, the generating step adapted to supply the PWM series of pulses as the pulsed signal; and
providing a tachometer signal representative of the motor speed to the motor control apparatus.

73. A control method for an electronically commutated motor having a stationary assembly with a plurality of winding stages for carrying a motor current and further having a rotatable assembly, and which control method is responsive to control pulses having a duty cycle representing a desired operating torque or speed for the motor, the control method being adapted for use with a commutating circuit for applying a voltage to one or more of the winding stages at a time in accordance with a pulsed signal and for commutating the winding stages in a preselected sequence to rotate the rotatable assembly, the control method comprising the steps of:
selecting the motor current or the motor voltage as a control parameter;
generating in response to the selected motor operating parameter a pulse width modulated (PWM) series of pulses having a duty cycle which is a function of the duty cycle of the control pulses, the generating step adapted to supply the PWM series of pulses to the commutating circuit as the pulsed signal whereby the torque of the motor is a function of the duty cycle of the control pulses when the motor current is selected as the control parameter and the speed of the motor is a function of the duty cycle of the control pulses when the motor voltage is selected as the control parameter.

74. Method of inducing a draft in a combustion chamber having an exhaust outlet including a fan for moving air through the exhaust outlet and thereby to induce a draft in the combustion chamber and an electronically commutated motor including a stationary armature having a core and at least two energizable winding stages arranged to establish a predetermined number of magnetic poles, and a permanent magnet rotor coupled to said fan and adapted to rotate in response to the magnetic poles established by said winding stages; said method comprising the steps of:
generating a pulse width modulated (PWM) series of pulses having a duty cycle representing a desired torque or speed of the motor;
applying a voltage to one or more of said winding stages at a time by use of power switching devices;
controlling the power switching devices in accordance with the PWM series of pulses;
commutating said winding stages in a preselected sequence to rotate said permanent magnet rotor and said fan;
comparing the applied voltage to a reference voltage;
increasing the duty cycle of the PWM series of pulses as a function of decreases in the applied voltage; and
decreasing the duty cycle of the PWM series of pulses as a function of increases in the applied voltage.

75. Method of inducing a draft in combustion chamber having an exhaust outlet including a fan for moving air through the exhaust outlet and thereby to induce a draft in the combustion chamber and an electronically commutated motor including a stationary armature having a core and at least two energizable winding stages arranged to establish a predetermined number of magnetic poles, and a permanent magnet rotor coupled to said fan and adapted to rotate in response to the magnetic poles established by said winding stages; said method comprising the steps of:
providing a tachometer signal representative of the motor speed;
storing a speed/torque profile of the motor;
generating a pulse width modulated (PWM) series of pulses having a duty cycle varying as a function of the motor speed/torque profile and the tachometer signal;
applying a voltage to one or more of said winding stages at a time in accordance with the PWM series of pulses; and
commutating said winding stages in a preselected sequence to rotate said permanent magnet rotor and said fan.

* * * * *